United States Patent
Di Benedetto et al.

(10) Patent No.: US 6,898,189 B1
(45) Date of Patent: May 24, 2005

(54) RESTARTABLE SPANNING TREE FOR HIGH AVAILABILITY NETWORK SYSTEMS

(75) Inventors: Marco Di Benedetto, Santa Clara, CA (US); Ramana Mellacheruvu, San Jose, CA (US); Umesh Mahajan, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 706 days.

(21) Appl. No.: 09/644,377

(22) Filed: Aug. 23, 2000

(51) Int. Cl.[7] .......................... H04L 12/28; G01R 31/08
(52) U.S. Cl. ..................... 370/256; 370/217; 370/389; 370/419
(58) Field of Search ................................ 370/256, 252, 370/401, 406, 408, 255, 254, 216, 217, 218, 419, 420, 219, 220; 709/223, 220, 221, 228, 245

(56) References Cited

U.S. PATENT DOCUMENTS

| | | |
|---|---|---|
| 4,811,337 A | 3/1989 | Hart |
| 4,922,486 A | 5/1990 | Lidinsky et al. |
| 5,018,137 A | 5/1991 | Backes et al. |
| 5,138,615 A | 8/1992 | Lamport et al. |
| 5,150,360 A | 9/1992 | Perlman et al. |
| 5,265,092 A | 11/1993 | Soloway et al. |
| 5,280,480 A | 1/1994 | Pitt et al. |
| 5,309,437 A | 5/1994 | Perlman et al. |
| 5,323,394 A | 6/1994 | Perlman |
| 5,327,424 A | 7/1994 | Perlman |
| 5,394,402 A | 2/1995 | Ross |
| 5,398,242 A | 3/1995 | Perlman |
| 5,400,333 A | 3/1995 | Perlman |
| 5,511,168 A | 4/1996 | Perlman et al. |
| 5,550,860 A | 8/1996 | Georgiou et al. |
| 5,606,669 A | 2/1997 | Bertin et al. |
| 5,684,800 A | 11/1997 | Dobbins et al. |
| 5,734,824 A | 3/1998 | Choi |
| 5,740,171 A | 4/1998 | Mazzola et al. |
| 5,742,604 A | 4/1998 | Edsall et al. |
| 5,752,003 A | 5/1998 | Hart |
| 5,761,435 A | 6/1998 | Fukuda et al. |
| 5,764,636 A | 6/1998 | Edsall |
| 5,790,808 A | 8/1998 | Seaman |
| 5,825,772 A | 10/1998 | Dobbins et al. |

(Continued)

FOREIGN PATENT DOCUMENTS

EP 0 324 277 A2 7/1989

OTHER PUBLICATIONS

U.S. Appl. No. 09/283,111, filed Mar. 31, 1999, Dey.
Part 3: Media Access Control (MAC) Bridges, ANSI/IEEE Std 802.1D, 1998 Edition, pp. 58–109.

(Continued)

Primary Examiner—Hanh Nguyen
(74) Attorney, Agent, or Firm—Cesari and McKenna, LLP

(57) ABSTRACT

A method and apparatus for continuing the operation of a spanning tree protocol at a network device despite crashes or failures at that device. A supervisor card contained in the network device is designated an active supervisor, while all other supervisor cards are designated standby supervisors. The active supervisor runs the spanning tree protocol, and informs the standby supervisors of the states of ports, but not of the identity of the root or designated bridges. When a crash or failure occurs at the active supervisor, one of the standby supervisors is immediately designated to be the new active supervisor. The newly active supervisor reviews the port state, and queries the line cards to determine whether that port state information is still valid. The newly active supervisor adopts the valid port state information, leaving those ports in their current spanning tree port state.

29 Claims, 12 Drawing Sheets

U.S. PATENT DOCUMENTS

| | | |
|---|---|---|
| 5,844,902 A | 12/1998 | Perlman |
| 5,870,386 A | 2/1999 | Perlman et al. |
| 5,878,232 A | 3/1999 | Marimuthu |
| 5,959,968 A | 9/1999 | Chin et al. |
| 5,959,989 A | 9/1999 | Gleeson et al. |
| 5,963,556 A | 10/1999 | Varghese et al. |
| 6,032,194 A * | 2/2000 | Gai et al. .................... 709/239 |
| 6,035,105 A | 3/2000 | McCloghrie et al. |
| 6,041,358 A | 3/2000 | Huang et al. |
| 6,081,512 A | 6/2000 | Muller et al. |
| 6,151,324 A | 11/2000 | Belser et al. |
| 6,202,114 B1 | 3/2001 | Dutt et al. |
| 6,236,659 B1 | 5/2001 | Pascoe |
| 6,262,977 B1 | 7/2001 | Seaman et al. |
| 6,298,061 B1 | 10/2001 | Chin et al. |
| 6,330,229 B1 | 12/2001 | Jain et al. |
| 6,487,591 B1 * | 11/2002 | Budhraja et al. ........... 709/223 |
| 6,515,969 B1 * | 2/2003 | Smith ......................... 370/256 |
| 6,535,490 B1 | 3/2003 | Jain |
| 6,578,086 B1 * | 6/2003 | Regan et al. ............... 709/242 |
| 6,611,502 B1 * | 8/2003 | Seaman ...................... 370/256 |
| 6,628,624 B1 | 9/2003 | Mahajan et al. |
| 6,628,661 B1 * | 9/2003 | Goldman et al. ........... 370/408 |

OTHER PUBLICATIONS

Using Redundant Supervisor Engines, Oct. 1999 http://www.cisco.com/univered/cc/cat5000/rel_5_2/config/redund.htm.

Draft Standard P802.1Q/D10, "IEEE Standards for Local and Metropolitan Area Networks: Virtual Bridged Local Area Networks," Mar. 22, 1998.

"Information Technology–Telecommunications and Information Exchange Between Systems–Local Area Networks–Media Access Control (MAC) Bridges," International Standard ISO/IEC 10038:1993, ANSI/IEEE Std 802.1D, 1993 Edition, pp. 43–67.

Seaman, Mark, "High Availability Spanning Tree," Rev. 1.1, pp. 1–15, Oct. 1998.

P802.1Q/D10, "Draft Standard for Local Area Networks MAC (Media Access Control) Bridges: Technical and Editorial Corrections," (c)1997, P802.1D, D14.

Perlman, Radia, "Interconnections: Bridges and Routers," 1992, pp. 54–64, Addison–Wesley Publishing Group.

Yener, et al., "Fault–Tolerant Convergence Routing," (c) 1994, pp. 229–238, IEEE.

Hart, John, "Extending the IEEE 802.1 MAC Bridge Standard to Remote Bridges," IEEE Network, Jan. 1988, vol. 2, No. 1.

MacKinnon, et al., "Lucent Technologies Inc.'s Initial Disclosure of Prior Art Under Civil Local Rule 16–7," U.S. District Court for Northern District of California, C.A. No. C98–20836JW (PVT) ENE, Nov. 18, 1998.

Horowitz, Steve, "Dual–Layer Spanning Tree: A Spanning Tree Proposal for IEEE 802.1Q," May 14, 1997.

Delaney and Seaman, "Single or Multiple Filtering Databases," May 8, 1997.

Murakami and Maruyama, "A MAPOS Version 1 Extention—Switch–Switch Protocol," Network Working Group, Request for Comments: 2174, Jun. 1997.

Horowitz, S., Dual–Layer Spanning Tree, A Spanning Tree Proposal for IEEE 802.1Q, May 14, 1997, pp. 45–48.

Seaman, M. and Delaney, D., Single or Multiple Filtering Databases, May 8, 1997, pp. 1–8.

Lucent Technologies Inc.'s Initial Disclosure of Prior Art Under Civil Local Rule 16–7, Case No. C98–20836 JW (PVT) ENE.

IEEE Standard 802.1D, Draft Standard for Local Area Networks MAC (Media Access Control) Bridges: Technical and Editorial Corrections, Mar. 6, 1997, pp. 3–10.85–122 and 151–158.

Perlman, Radia, Interconnections: Bridges and Routers, (c) 1992, pp. 54–64.

Hart, John, Extending the IEEE 802.1 MAC Bridge Standard to Remote Bridges, IEEE Network, Jan. 1988, pp. 10–15, vol. 2, No. 1.

Bhandari, I, Ofek, Y, Bulent, Y., and Yung, M., Fault–Tolerant Convergance Routing, IEEE, 1994, pp. 229–238.

Perlman, R., An Algorithm for Distributed Computation of Spanning Tree in an Extended LAN, ACM ISSN 0146–4833, 1985, pp. 44–53.

Cheng, C., A protocol to maintain a Minimum Spanning Tree in a Dynamic Topology, Cimet I.A.; Kumar P.R., ACM 0–8979–279 9/88/088/0330, 1998, pp. 330–338.

Murakami, K. and Maruyama, M., A MAPOS version 1 Extension–Switch–Switch Protocol, Network Working Groug, RFC: 2174, Jun. 1997, pp. 1–23.

Seaman, M., A More Robust Tree: Active Topology Maintenance in Reconfiguring Bridged Local Area Networks (STP), 3Com Corp. Mar. 1996.

Seaman, Mick, High Availability Spanning Tree, Rev. 1.1, pp. 1–15.

Information technology–Telecommunications and information exchange between systems—Local area networks—Media access control (MAC) bridges, International Standard ISO/IEC 10038:1993 ANSI/IEEE Std 802.1D, (c) 1993, pp. Table of Contents, 43–67, 82–83.

Cisco Systems, Inc: Catalyst 5000 Series Release Notes for Software Release 2.1, Doc. No. 78–2896–02, 1996, pp. 1–12.

Cisco Systems, Inc: Release Notes for Catalyst 2820 Series and Catalyst 1900 Series Firmware Version 5.35, Doc. No. 78–3817–05, Aug. 1997, pp. 1–8.

Configuration and Monitoring Switch Node Software, Bay Networks, BCC Version 3.0, May 1997.

SK–NET Switch 6616 Ethernet/FDDI Switch Configuration Guide, SysKonnet Inc., Mar. 1995, pp. 1–42.

* cited by examiner

RESTARTABLE SPANNING TREE FOR HIGH AVAILABILITY NETWORK SYSTEMS

CROSS-REFERENCE TO RELATED APPLICATIONS

This application is related to the following co-pending, commonly owned U.S. patent applications:

U.S. patent application Ser. No. 09/208,175 entitled VALUE-ADDED FEATURES FOR THE SPANNING TREE PROTOCOL, filed Dec. 9, 1998; and U.S. patent application Ser. No. 09/283,111 entitled METHOD AND APPARATUS FOR PROVIDING FAST SPANNING TREE RE-STARTS, filed Mar. 31, 1999.

BACKGROUND OF THE INVENTION

1. Field of the Invention

The present invention relates generally to computer networks, and more specifically, to a method and apparatus for quickly resuming the forwarding of network messages despite failures.

2. Background Information

A computer network typically comprises a plurality of interconnected entities. An entity may consist of any device, such as a computer or end station, that "sources" (i.e., transmits) or "sinks" (i.e., receives) data frames. A common type of computer network is a local area network ("LAN") which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack). In many instances, several LANs may be interconnected by point-to-point links, microwave transceivers, satellite hook-ups, etc. to form a wide area network ("WAN") or intranet that may span an entire country or continent.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information between a plurality of LANs or end stations. Typically, the bridge or switch is a computer and includes a plurality of ports that couple the device to the LANs or end stations. Ports used to couple switches to each other are generally referred to as a trunk ports, whereas ports used to couple a switch to LANs or end stations are generally referred to as access ports. The switching function includes receiving data from a sending entity at a source port and transferring that data to at least one destination port for forwarding to the receiving entity.

Switches and bridges typically learn which destination port to use in order to reach a particular entity by noting on which source port the last message originating from that entity was received. This information is then stored by the bridge in a block of memory referred to as a filtering database. Thereafter, when a message addressed to a given entity is received on a source port, the bridge looks up the entity in its filtering database and identifies the appropriate destination port to reach that entity. If no destination port is identified in the filtering database, the bridge floods the message out all ports, except the port on which the message was received. Messages addressed to broadcast or multicast addresses are also flooded.

Additionally, most computer networks are either partially or filly meshed. That is, they include redundant communications paths so that a failure of any given link or device does not isolate any portion of the network. The existence of redundant links, however, may cause the formation of circuitous paths or "loops" within the network. Loops are highly undesirable because data frames may traverse the loops indefinitely. Furthermore, because switches and bridges replicate (i.e., flood) frames whose destination port is unknown or which are directed to broadcast or multicast addresses, the existence of loops may cause a proliferation of data frames that effectively overwhelms the network.

Spanning Tree Algorithm

To avoid the formation of loops, most bridges and switches execute a spanning tree algorithm which allows them to calculate an active network topology that is loop-free (i.e., a tree) and yet connects every pair of LANs within the network (i.e., the tree is spanning). The Institute of Electrical and Electronics Engineers (IEEE) has promulgated a standard (the 802.1D standard) that defines a spanning tree protocol to be executed by 802.1D compatible devices. In general, by executing the IEEE spanning tree protocol, to bridges elect a single bridge within the bridged network to be the "root" bridge. Since each bridge has a unique numerical identifier (bridge ID), the root is typically the bridge with the lowest bridge ID. In addition, for each LAN coupled to more than one bridge, only one (the "designated bridge") is elected to forward frames to and from the respective LAN. The designated bridge is typically the one closest to the root. Each bridge also selects one port (its "root port") which gives the lowest cost path to the root. The root ports and designated bridge ports are selected for inclusion in the active topology and are placed in a forwarding state so that data frames may be forwarded to and from these ports and thus onto the corresponding paths or links of the network. Ports not included within the active topology are placed in a blocking state. When a port is in the blocking state, data frames will not be forwarded to or received from the port. A network administrator may also exclude a port from the spanning tree by placing it in a disabled state.

To obtain the information necessary to run the spanning tree protocol, bridges exchange special messages called configuration bridge protocol data unit (BPDU) messages. FIG. 1 is a block diagram of a conventional BPDU message 100. The BPDU message 100 includes a message header 102 compatible with the Media Access Control (MAC) layer of the respective LAN standard. The message header 102 comprises a destination address (DA) field 104, a source address (SA) field 106, and a Service Access Point (SAP) field 108, among others. The DA field 104 carries a unique bridge multicast destination address assigned to the spanning tree protocol. Appended to header 102 is a BPDU message area 110 that also contains a number of fields, including a Topology Change Acknowledgement (TCA) flag 112, a Topology Change (TC) flag 114, a root identifier (ROOT ID) field 116, a root path cost field 118, a bridge identifier (BRIDGE ID) field 120, a port identifier (PORT ID) field 122, a message age (MSG AGE) field 124, a maximum age (MAX AGE) field 126, a hello time field 128, and a forward delay (FWD DELAY) field 130, among others. The root identifier field 116 typically contains the identifier of the bridge assumed to be the root and the bridge identifier field 120 contains the identifier of the bridge sourcing (i.e., sending) the BPDU 100. The root path cost field 118 contains a value representing the cost to reach the assumed root from the port on which the BPDU is sent and the port identifier field 122 contains the port number of the port on which the BPDU is sent.

Upon start-up, each bridge initially assumes itself to be the root and transmits BPDU messages accordingly. Upon receipt of a BPDU message from a neighboring device, its contents are examined and compared with similar information (e.g., assumed root and lowest root path cost) stored by the receiving bridge in non-recoverable memory. If the information from the received BPDU is "better" than the stored information, the bridge adopts the better information and uses it in the BPDUs that it sends (adding the cost associated with the receiving port to the root path cost) from its ports, other than the port on which the "better" information was received. Although BPDU messages are not forwarded by bridges, the identifier of the root is eventually propagated to and adopted by all bridges as described above, allowing them to select their root port and any designated port(s).

In order to adapt the active topology to failures, the root periodically (e.g., every hello time) transmits BPDU messages. The hello time utilized by the root is also carried in the hello time field 128 of its BPDU messages. The default hello time is 2 seconds. In response to receiving BPDUs on their root ports, bridges transmit their own BPDUs from their designated ports, if any. Thus, every two seconds BPDUs are propagated throughout the bridged network, confirming the active topology. As shown in FIG. 1, BPDU messages stored by the bridges also include a message age field 124 which corresponds to the time since the root instigated the generation of this BPDU information. That is, BPDU messages from the root have their message age field 124 set to "0". Thus, every hello time, BPDU messages with a message age of "0" are propagated to and stored by the bridges.

After storing these BPDU messages, bridges proceed to increment the message age value every second. When the next BPDU message is received, the bridge examines the contents of the message age field 124 to determine whether it is smaller than the message age of its stored BPDU message. Assuming the received BPDU message originated from the root and thus has a message age of "0", the received BPDU message is considered to be "better" than the stored BPDU information (whose message age has presumably been incremented to "2" seconds) and, in response, the bridge proceeds to recalculate the root, root path cost and root port based upon the received BPDU information. The bridge also stores this received BPDU message and proceeds to increment its message age timer. If the message age of a stored BPDU message reaches a maximum age value, as specified in the MAX AGE field 126, the corresponding BPDU information is considered to be stale and is discarded by the bridge.

Normally, each bridge replaces its stored BPDU information every hello time, thereby preventing it from being discarded and maintaining the current active topology. If a bridge stops receiving BPDU messages on a given port (indicating a possible link or device failure), it will continue to increment the respective message age value until it reaches the maximum age threshold. The bridge will then discard the stored BPDU information and proceed to re-calculate the root, root path cost and root port by transmitting BPDU messages utilizing the next best information it has. The maximum age value used within the bridged network is typically set by the root, which enters the appropriate value in the maximum age field 126 of its transmitted BPDU messages. Neighboring bridges similarly load this value in their BPDU messages, thereby propagating the selected value throughout the network. The default maximum age value under the IEEE standard is twenty seconds.

As BPDU information is updated and/or timed-out and the active topology is recalculated, ports may transition from the blocking state to the forwarding state and vice versa. That is, as a result of new BPDU information, a previously blocked port may learn that it should be in the forwarding state (e.g., it is now the root port or a designated port). Rather than transition directly from the blocking state to the forwarding state, ports typically transition through two intermediate states: a listening state and a learning state. In the listening state, a port waits for information indicating that it should return to the blocking state. If, by the end of a preset time, no such information is received, the port transitions to the learning state. In the learning state, a port still blocks the receiving and forwarding of frames, but received frames are examined and the corresponding location information is stored in the filtering database, as described above. At the end of a second preset time, the port transitions from the learning state to the forwarding state, thereby allowing frames to be forwarded to and from the port. The time spent in each of the listening and the learning states is referred to as the forwarding delay and is entered by the root in the FWD DELAY field 130.

As ports transition between the blocked and forwarding states, entities may appear to move from one port to another. To prevent bridges from distributing messages based upon incorrect address information, bridges quickly age-out and discard the "old" information in their filtering databases. More specifically, upon detection of a change in the active topology, a bridge periodically transmits a Topology Change Notification Protocol Data Unit (TCN-PDU) frame on its root port. The format of the TCN-PDU frame is well known (see IEEE 802.1D standard) and, thus, will not be described herein. A bridge receiving a TCN-PDU sends a TCN-PDU of its own from its root port, and sets the TCA flag 112 in BPDUs that it sends on the port from which the TCN-PDU was received, thereby acknowledging receipt of the TCN-PDU. By having each bridge send TCN-PDUs from its root port, the TCN-PDU is effectively propagated hop-by-hop from the original bridge up to the root. The root confirms receipt of the TCN-PDU by setting the TC flag 114 in the BPDUs that it subsequently transmits for a period of time. Other bridges, receiving these BPDUs, note that the TC flag 114 has been set by the root, thereby alerting them to the change in the active topology. In response, bridges significantly reduce the aging time associated with their filtering databases which, as described above, contain destination information corresponding to the entities within the bridged network. Specifically, bridges replace the default aging time of 5 minutes with the forwarding delay time, which by default is fifteen seconds. Information contained in the filtering databases is thus quickly discarded.

Although the spanning tree protocol is able to maintain a loop-free topology despite network changes and failures, re-calculation of the active topology can be a time consuming and processor intensive task. For example, re-calculation of the spanning tree following an intermediate device crash or failure can take approximately thirty seconds. In particular, a crash or failure typically wipes out the BPDU information stored by a bridge. Upon re-start, the bridge assumes itself to be the root, places all of its ports in the blocking and/or listening states and proceeds to transmit BPDU messages accordingly. It thus takes at least thirty seconds for a bridge to recover from a crash or failure (e.g., fifteen seconds in the listening state and another fifteen seconds in the learning state). During this time, message delivery is often delayed as ports transition between states, because ports in the listening and learning states do not forward or receive messages. Such delays can have serious consequences on time-sensitive traffic flows, such as voice or video traffic streams.

Furthermore, short duration failures or crashes of the spanning tree protocol at a given bridge is not an infrequent problem. For example, failures or crashes can occur due to power fluctuations, glitches in the running of the spanning tree protocol software modules, glitches running other bridge processes that cause the spanning tree process to fail, etc. Even if a bridge or just the spanning tree process is only "down" for a few seconds and thus no change in port states may be warranted, re-calculation of the spanning still requires on the order of thirty seconds. Accordingly, significant time is wasted recalculating the spanning tree following re-starts, even though no change in network topology has occurred and the ports are ultimately returned to their original states.

Virtual Local Area Networks

It is also known to segregate a computer network into a series of logical network segments. U.S. Pat. No. 5,394,402, issued Feb. 28, 1995 (the "'402 patent"), for example, discloses an arrangement for associating any port of a switch with any particular segregated network group. Specifically, according to the '402 patent, any number of physical ports of a particular switch may be associated with any number of groups within the switch by using a virtual local area network (VLAN) arrangement that virtually associates the port with a particular VLAN designation. More specifically, the '402 patent discloses a switch or hub that associates VLAN designations with its ports and further associates those VLAN designations with messages transmitted from any of the ports to which the VLAN designation has been assigned.

The VLAN designation for each port is stored in a memory portion of the switch such that every time a message is received on a given access port the VLAN designation for that port is associated with the message. Association is accomplished by a flow processing element which looks up the VLAN designation in the memory portion based on the particular access port at which the message was received. In many cases, it may be desirable to interconnect a plurality of these switches in order to extend the VLAN associations of ports in the network. The '402 patent, in fact, states that an objective of its VLAN arrangement is to allow all ports and entities of the network having the same VLAN designation to exchange messages by associating a VLAN designation with each message. Thus, those entities having the same VLAN designation function as if they are all part of the same LAN. Message exchanges between parts of the network having different VLAN designations are specifically prevented in order to preserve the boundaries of each VLAN segment or domain. For convenience, each VLAN designation is often associated with a different color, such as red, blue, green, etc.

In addition to the '402 patent, the Institute of Electrical and Electronics Engineers (IEEE) has promulgated the 802.1Q standard for Virtual Bridged Local Area Networks. The 802.1Q standard, among other things, defines a specific VLAN-tagged message format.

To provide redundancy, it is also known to install at least two bridge processing cards in an intermediate network device. The Catalyst 5500 and 6000 series of network devices from Cisco Systems, Inc. of San Jose, Calif., for example, include two bridge processing cards. Each of these cards, moreover, includes facilities for running the spanning tree protocol, including processing and memory components. If a crash or failure occurs on the currently active processing card, the back-up card takes over and begins running the spanning tree protocol. The back-up card, however, starts calculating the spanning tree protocol as if the device were just activated. That is, the back-up card transitions all ports to the blocking state and begins transmitting BPDU messages assuming it is the root. Accordingly, it typically takes on the order of 30 seconds or more for the device to begin forwarding messages again. As indicated above, such delays can seriously affect audio, video and other types of network traffic.

SUMMARY OF THE INVENTION

Briefly, the invention relates to a method and apparatus for continuing the operation of a spanning tree protocol at a network device despite crashes or failures at that device. According to the invention, the network device includes a plurality of line cards having ports for receiving and forwarding network messages, and a plurality of supervisor cards for processing at least some of those messages. Each supervisor card includes a spanning tree protocol (STP) engine, a run-time memory and a non-volatile memory. The non-volatile memory at each supervisor card is preferably configured with STP-related information. The STP engines are also in communication with the line cards so as to obtain bridge protocol data unit messages (BPDUs) that are received by the network device, and to provide the line cards with BPDUs for forwarding. Upon start-up of the network device, one of the supervisor cards is designated the active supervisor and all other supervisor cards are designated standby supervisors. The STP engine on the active supervisor generates all BPDUs forwarded by the network device and processes all of the BPDUs that are received by the device. The active STP engine also identifies the root of the bridged network, and directs the ports of the device to transition among a plurality of STP states, e.g. blocking, listening, forwarding, etc., in accordance with the spanning tree protocol. The identity of the root device and the port state information is stored by the active supervisor in its run-time memory.

The active STP engine also informs the standby supervisors of any changes in port states, and this port state information is stored at the run-time memories of the standby supervisors. In the preferred embodiment, however, the standby supervisors are not informed of the identity of the root. When a crash or failure occurs at the active supervisor, one of the standby supervisors is immediately designated to be the new active supervisor, and the corresponding STP engine is initialized. The newly active STP engine reviews the port state information in its run-time memory, and queries the line cards to determine whether that port state information is still valid. The STP engine adopts the port state information that is valid, discards any suspect port state information and resumes STP operation for the switch. In addition, the newly active STP engine generates BPDUs assuming that it is the root, by utilizing the STP-related information from its nonvolatile memory. These BPDUs are then passed to the line cards for forwarding. To the extent neighboring intermediate devices respond with BPDUs of their own, the newly active STP engine can quickly determine what device is the correct root by examining these received BPDUs. The switchover from the STP engine at the failed supervisor to the STP engine at the newly active supervisor is thus accomplished before the other intermediate devices within the network are forced to recalculate the spanning tree, thereby avoiding significant network disruption.

BRIEF DESCRIPTION OF THE DRAWINGS

The invention description below refers to the accompanying drawings, of which.

DETAILED DESCRIPTION OF AN ILLUSTRATIVE EMBODIMENT

Figure 2:
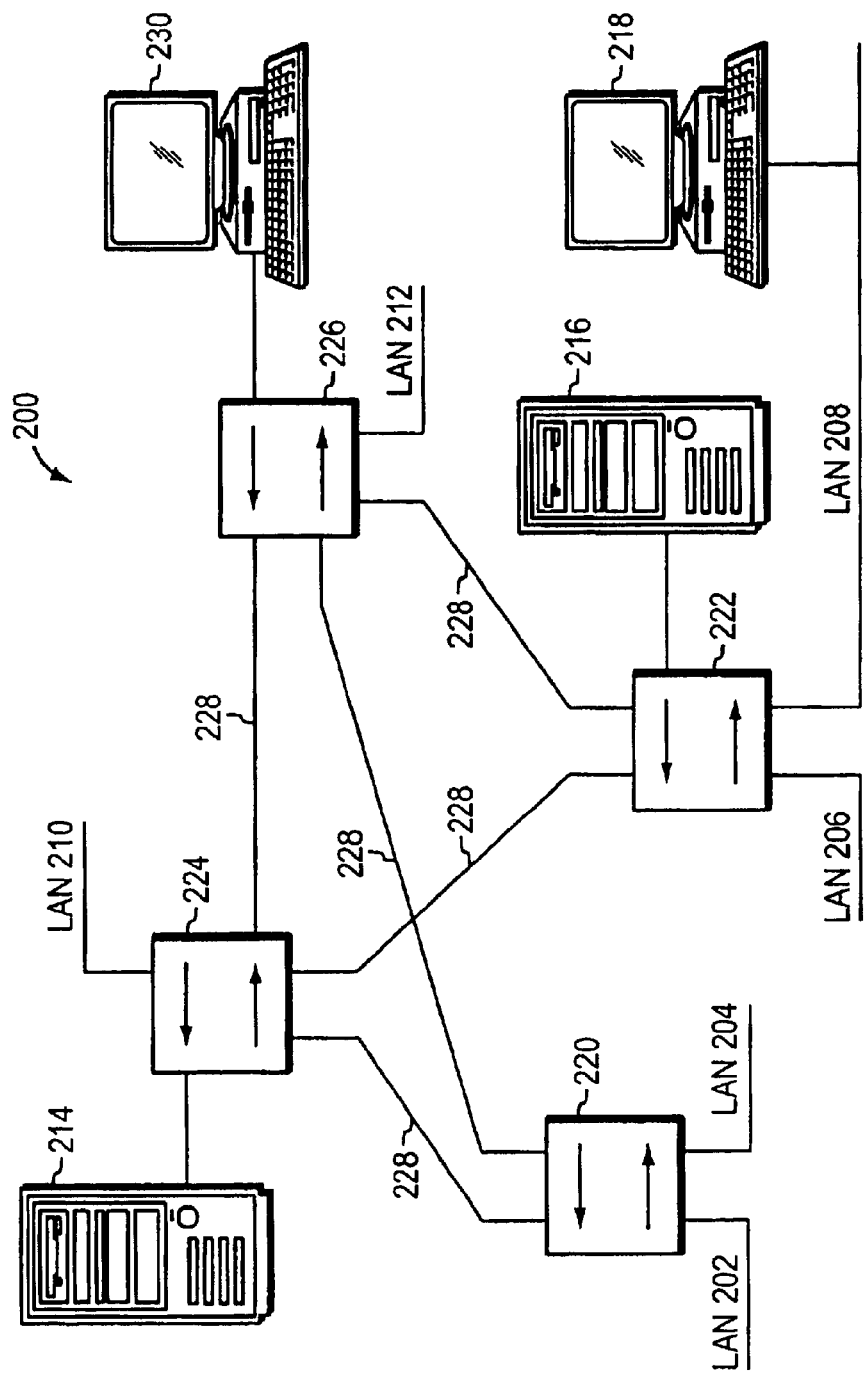
FIG. 2 is a highly schematic diagram of a computer network in accordance with the present invention.

FIG. 2 illustrates a computer network 200 in accordance with the present invention. The network 200 preferably comprises a plurality of local area networks (LANs) 202–212 and servers 214, 216, such as file servers, print servers, etc. Attached to the LAN 208, which may source or sink data frames over the network 200. That is, LANs 202–212 and servers 214, 216 are preferably coupled to one or more intermediate network devices, such as switches 220–226. An end station, such as end station 230, may also be connected directly to a switch, such as switch 226. Switches 220–226, in turn, are interconnected through a series of links 228, such as point-to-point links or trunks. More specifically, each switch 220–226 includes a plurality of ports that are coupled to corresponding LANs, servers, end stations and trunk links, and each port, such as the ports at switch 226, may be identified by a corresponding port number (e.g., port 1, port 2, port 3, etc.) Switches 220–226 are thus able to associate their specific ports with the LANs, switches, servers, etc. that are coupled thereto or otherwise accessible through a given port.

As shown, network 200 includes a plurality of redundant communication paths. The existence of such redundant paths prevents portions of the network 200 from becoming isolated should any constituent link or intermediate network device fail. Such redundancy, however, also results in the creation of loops, which, as described above, are highly undesirable. To avoid the creation of loops, switches 220–226 preferably execute a spanning tree protocol. Switches 220–226 also include a high availability spanning tree feature as described herein so as to improve network performance in the face of crashes and failures.

It should be understood that the bridged network 200 of FIG. 2 is meant for illustrative purposes only and that the present invention will operate with other network designs having possibly far more complex topologies.

Figure 3:
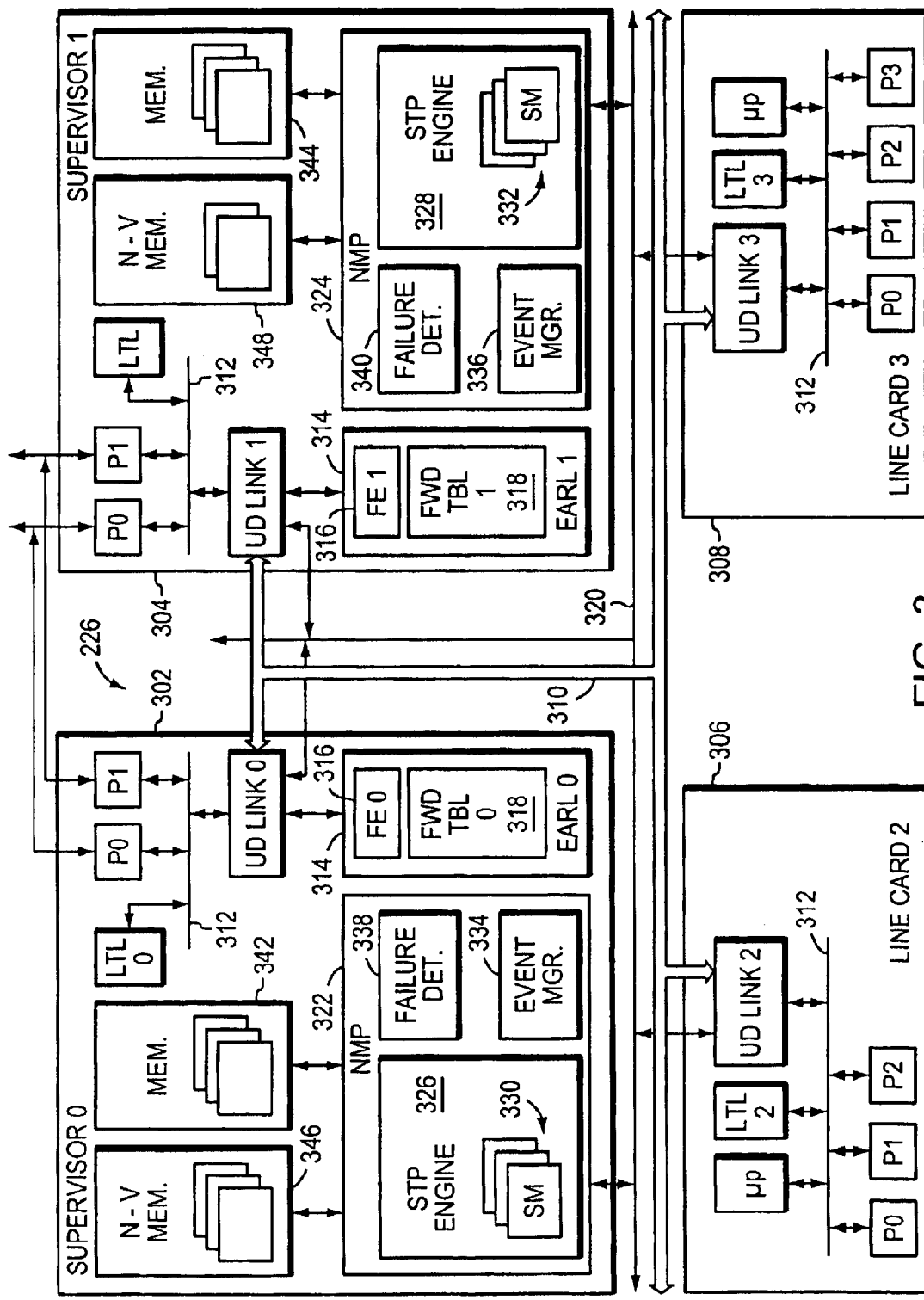
FIG. 3 is a partial block diagram of an intermediate network device in accordance with a preferred embodiment of the present invention.

FIG. 3 is a partial block diagram of switch 226 in accordance with the present invention. Switch 226 preferably includes a plurality of supervisor cards 302, 304 (e.g., supervisor cards 0 and 1), and a plurality of line cards or modules 306, 308 (e.g., line cards 2 and 3). Supervisor cards 302, 304 and line cards 306, 308 are interconnected by a high speed message bus 310. Each line card 306, 308 comprises a plurality of ports P (e.g., P0–P2), a microprocessor ($\mu$p), a local target logic (LTL) memory and an up/down link (UDlink) interface circuit. The ports P of a line card, e.g., line card 306, are interconnected with each other and with the UDlink by a local bus 312 that is disposed on the line card 306. The supervisor cards 302, 304 may similarly include their own ports P, local target logic (LTL) memory, UDlink, and local bus 312. In order to render forwarding decisions that can be implemented by the switch 226, each supervisor card 302, 304 preferably includes an encoded address recognition logic (EARL) circuit 314 coupled to its UDlink and microprocessor. EARL 314 executes all forwarding decisions between the ports P of the line cards 306, 308 and the supervisor cards 302, 304. To that end, each EARL circuit 314 contains a forwarding engine (FE) 316 and at least one forwarding table (FWD TBL) 318 configured to produce a unique destination port index value. The LTL memories implement "local" forwarding decisions, i.e., forward decisions among ports of the same line card or supervisor card.

High speed message bus 310 is preferably a switching matrix employed to control the transfer of data among the various cards 302–308 plugged into the switch 226. The UDlink of each card basically interfaces between the local bus 312 and the message bus 310. Inputs to the various LTL memories may be received over the respective local buses 312, which are driven by the corresponding UDlinks. Switch 226 also includes a common bus 320 that similarly interconnects the line cards 306, 308 and supervisor cards 302, 304.

Each supervisor card 302, 304 further includes a network management processor (NMP) 322, 324 that may be configured to run a plurality of protocols or other applications implemented at switch 226. For example, each NMP 322, 324 can run a spanning tree protocol (STP), as illustrated by STP engines 326, 328. Each STP engine 326, 328, in turn, may include a plurality of state machines, which are generally designated 330 and 332, respectively. As described herein, the state machines 330, 332 are used to transition the ports P of switch 226 among a plurality of spanning tree states. The NMPs 322, 324 at each supervisor 302, 304 are further configured to run an event manager 334, 336, and a failure detection module 338, 340. Each supervisor 302, 304 also includes both a runtime memory 342, 344, such as a random access memory (RAM), and a non-volatile memory 346, 348, such as a non-volatile RAM. The NMPs 322, 324 are in communicating relationship with the corresponding memories 330, 334 and 332, 336, in order to store and retrieve information therefrom. Each NMP 322, 324 is also coupled to high-speed bus 310 and common 320 so that information may be exchanged between the NMPs 322, 324 and the line cards 306, 308.

STP engines 326, 328, event managers 334, 336 and failure detection modules 338, 340 may each comprise programmed or programmable program instructions or processing elements, such as software programs, modules or libraries, pertaining to the methods described herein and executable by the respective NMPs or by other processors. These program instructions may be stored at memories 342–348. Other computer readable media may also be used to store the program instructions for execution. STP engines 326, 328, event managers 334, 336 and failure detection modules 338, 340 may also be implemented in hardware through a plurality of registers and combinational logic configured to produce sequential logic circuits and cooperating state machines. Those skilled in the art will also recognize that various combinations of hardware and software components may also be utilized to implement the present invention.

Suitable intermediate network device platforms for use with the present invention include the commercially available Catalyst 6000 series of switches from Cisco Systems, Inc. of San Jose, Calif.

Prior to its activation, switch 226 is preferably configured with default spanning tree parameters which it is to use if it is elected to be the root of the bridged network 200. More specifically, a network administrator, working either locally or remotely from switch 226, sets the spanning tree parameters specified by the IEEE 802.1D Bridge Standard, e.g., bridge priority, root path costs, hello time, maximum age time, forward delay time, etc. This information is preferably stored by switch 226 at its non-volatile memories 334, 336. In accordance with the present invention, the forward delay time is preferably set to ten seconds or more to facilitate the switchover from an active supervisor card to a standby supervisor card following a failure or crash.

Spanning Tree Protocol Operation

FIGS. 4 and 7–10 are flow diagrams of the preferred methods for achieving the high availability spanning tree feature of the present invention. As indicated at block 402 (FIG. 4), upon activation or start-up of switch 226, each supervisor 302, 304 preferably initializes or creates a plurality of data structures in its respective run-time memories 342, 344 for use in running the spanning tree protocol. In the illustrative embodiment, each STP engine 326, 328 establishes a virtual local area network (VLAN) table (not shown) that has an entry for each possible VLAN designation that is established within network 200. For example, if network 200 has 100 VLAN designations (numbered 0 through 99), then the VLAN tables will have 100 entries. Each entry of the VLAN tables, moreover, contains at least three items of information: (1) an index identifying the ports P of switch 226 that are associated with the respective VLAN designation; (2) a pointer to a bridge data structure; and (3) a pointer to a linked list of port data structures that correspond to the ports P that are associated with the respective VLAN designation. Details of the bridge and port data structures are described below in connection with FIGS. 5 and 6.

Next, the two supervisors 302, 304 elect or designate one of them to be the "active supervisor", as indicated at block 404. Supervisors 302, 304 may employ any suitable criteria for use in electing one of them to be the active supervisor, such as electing the supervisor card that is inserted into the lowest (or highest) slot number. Each supervisor 302, 304, moreover, may include some mechanism, such as an elector (not shown), to perform the designation. Suppose, for example, that supervisor 304 is elected to be the active supervisor. All other supervisors at switch 226, i.e., supervisor 302, are designated "standby supervisors". Upon being designated the active supervisor, the STP engine 328 at the active supervisor 304 preferably synchronizes the default spanning tree parameter values at the standby supervisors with its default spanning tree parameter values as indicated at block 406. That is, in case the STP information between the active and standbys differs, STP engine 328 sends a copy of the spanning tree parameter values from its non-volatile memory 348 to STP engine 326 at standby supervisor 302. The standby STP engine 326 utilizes this information to update the spanning tree parameters in its non-volatile memory 314.

The STP engine 328 on the active supervisor 304, but not the standby STP engine 326, is then initialized and run, as indicated at block 408. That is, standby STP engines, i.e., STP engine 326, remain dormant or in a sleeping mode. The active STP engine 328 proceeds to compute a spanning tree for each VLAN designation in the bridged network 200 (FIG. 2). More specifically, STP engine 328 assumes that it (i.e., switch 226) is the root of the bridged network 200 for all VLANs, generates tagged BPDU messages, and passes these tagged BPDUs to the line cards 306, 308 so that they may be forwarded from all non-disabled ports P of the switch 226. To generate the BPDU messages, STP engine 328 retrieves the spanning tree parameter values from non-volatile memory 348. These values are then loaded into the appropriate fields of the BPDU messages. To the extent the active supervisor 304 has its own non-disabled ports, BPDU messages are similarly transmitted from them. In addition, STP engine 328 in cooperation with its constituent state machines 332 transitions all of the non-disabled ports P of switch 226 to the blocking state.

Neighboring switches, e.g., switches 220, 222 and 224 receive the BPDU messages generated and sent by switch 226. In response, they may reply to switch 226 with BPDU messages of their own. BPDU messages received at switch 226 are captured by the line cards 306, 308 and passed to the active STP engine 328 via high-speed bus 310. Their contents are examined and compared with the "best" spanning tree values currently known to STP engine 328 in order to compute or identify the root, the root port and any designated ports for each VLAN designation. These values are then loaded into the respective spanning tree data structures (i.e., the bridge and port data structures), as also indicated by block 408.

Figure 5:
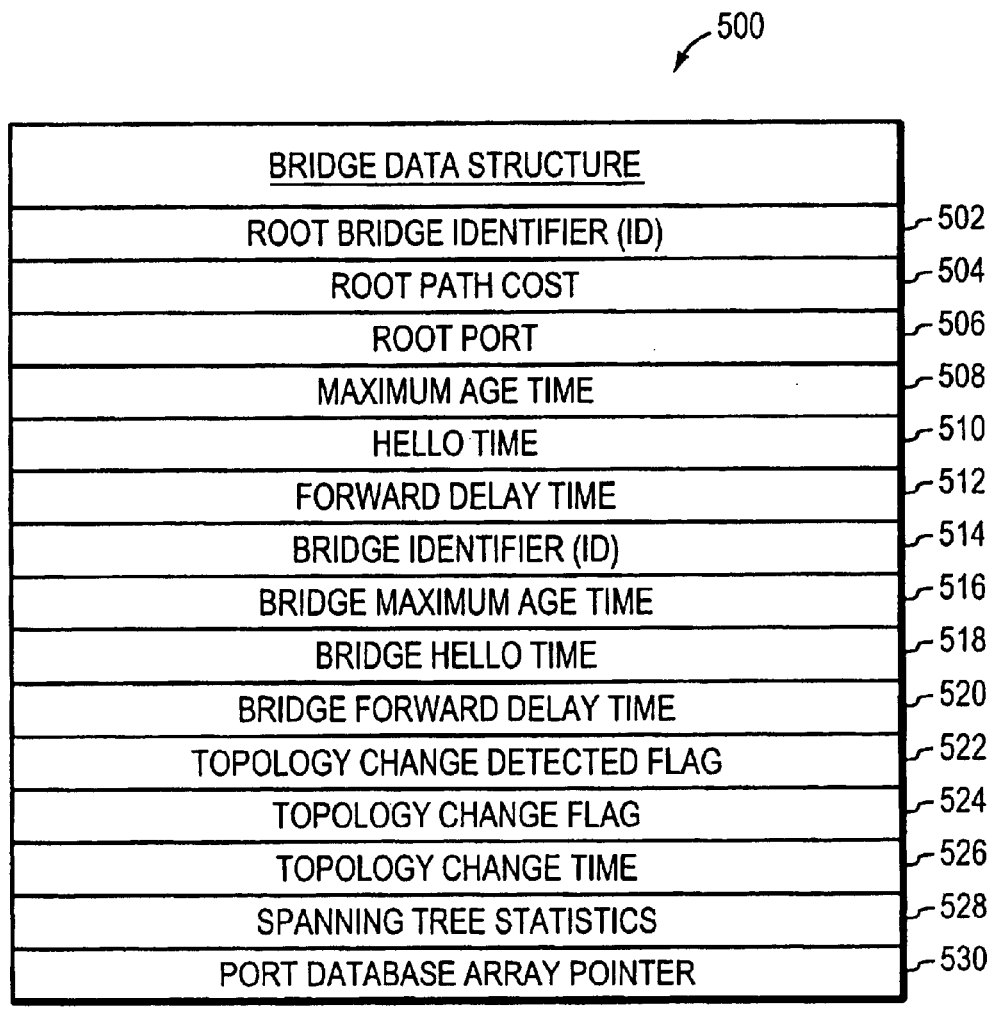
FIGS. 5, 6 and 11 are highly schematic block diagrams of preferred data structures utilized by the present invention.

FIG. 5 is a highly schematic block diagram of the preferred format of a bridge data structure 500. Bridge data structure 500 includes a root bridge identifier (ID) field 502 that contains the numeric identifier of the bridge that has been elected the root for the corresponding VLAN, a root path cost field 504 that contains the lowest path cost to the elected root, as determined by STP engine 328, and a root port field 506 that contains the identifier of the port providing the lowest cost path to the root from switch 226. For example, for a given VLAN designation (e.g., "red"), STP engine 328 may conclude that device 220 is the root and that port P0 on line card 306 provides the lowest path cost to device 220 and is thus its root port for the red VLAN designation. Accordingly, STP engine 328 loads field 502 with the numeric bridge ID for device 220, field 504 with the lowest path cost to reach device 220, and field 506 with the numeric port identifier for port P0 at line card 306.

The bridge data structure 500 further includes a maximum age time field 508, a hello time field 510 and a forward delay time field 512, which preferably contain corresponding time parameters specified by the root device (e.g., switch 220) for the respective VLAN designation. A bridge identifier (ID) field 514 contains the numeric identifier for device 226. A bridge maximum age time field 516, a bridge hello time field 518 and a bridge forward delay time field 520 preferably contain the corresponding spanning tree time parameters that are to be implemented by device 226 should it become the root for the respective VLAN designation. The contents of fields 516–520 may be obtained by the STP engine 328 from non-volatile memory 348, which was previously configured with this information by the network administrator.

The bridge data structure 500 also includes information related to spanning tree topology changes. More specifically, bridge data structure 500 preferably includes a Topology Change Detected Flag field 522 that contains a flag asserted by STP engine 328 if it detects a change in the active topology for the spanning tree associated with the respective VLAN designation. A Topology Change flag field 524 is asserted if STP engine 328 is to assert the TCN flag in BPDU messages sourced by STP engine 328. A Topology Change Time field 526 contains the amount of time for which the STP engine 328, if elected to be the root for this VLAN designation, asserts the TCN flag in BPDU messages following receipt of a TCN-PDU message. One or more spanning tree statistics fields, e.g., field 528, may also be included for storing statistical information on the running of the corresponding spanning tree.

Bridge data structure 500 also contains a port database array pointer field 530, which contains a pointer to a location in run-time memory 344 at which a port database array for the respective VLAN designation is stored. The port database array is described in more detail below.

Figure 1:
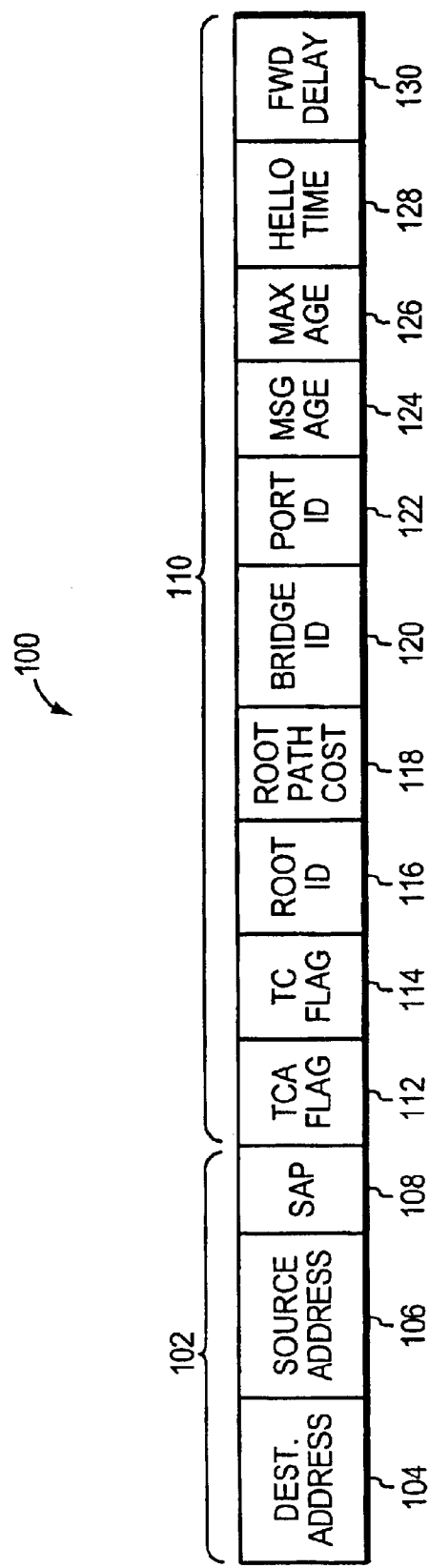
FIG. 1 is, previously discussed, is a block diagram of a conventional configuration bridge protocol data unit (BPDU) message.
Figure 6:
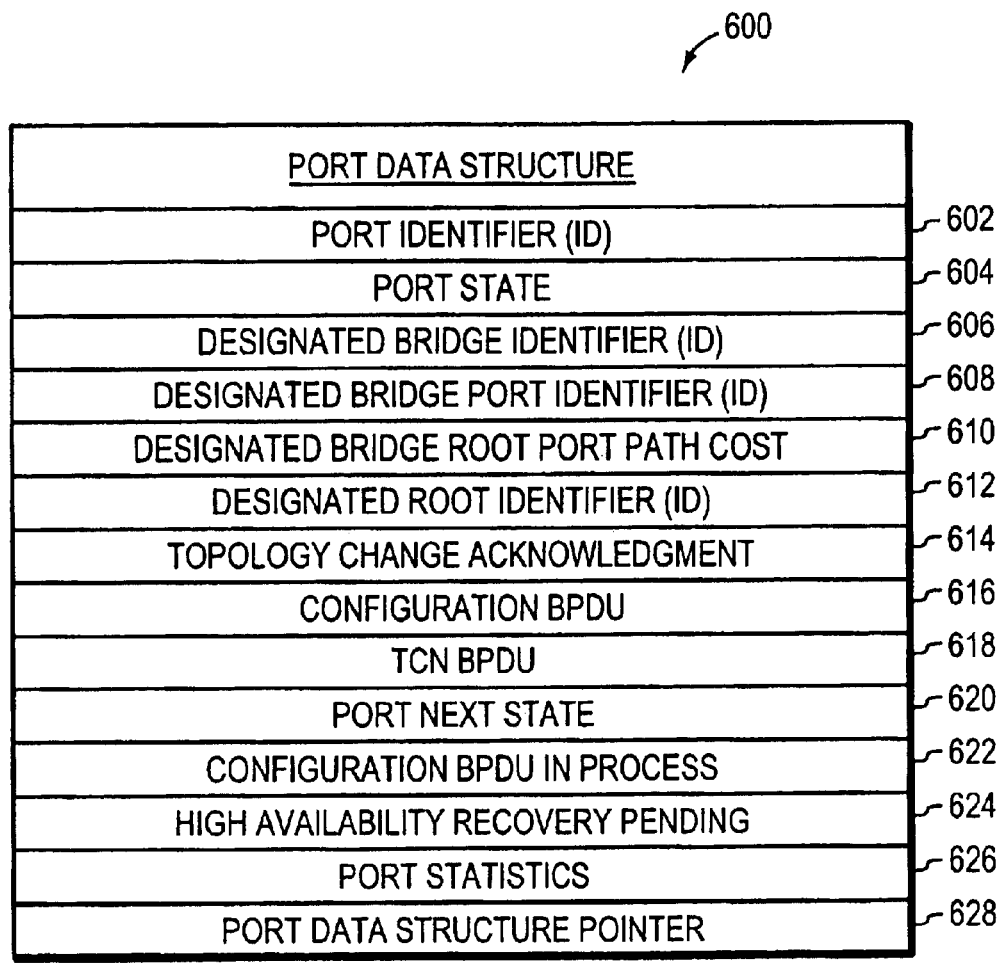

FIG. 6 is a highly schematic illustration of a port data structure 600. The port data structure 600 also has a plurality of fields, including a port identifier (ID) field 602 that contains the identifier for the respective port P, a port state field 604 that contains the spanning tree state of the respective port (e.g., blocking, listening, learning or forwarding) as computed by the STP engine 328. A designated bridge ID field 606 and a designated bridge port ID field 608 contain the numeric bridge ID and the numeric port ID, respectively, for the bridge and port that are currently understood to be the designated bridge and port for the LAN, if any, to which the respective port P is coupled. Similarly, a designated bridge port root path cost field 610 contains the path cost from the designated bridge port to the root. A designated root identifier (ID) field 612 contains the numerical bridge ID for the bridge currently understood to be the root for the VLAN designation associated with this port data structure 600. A Topology Change Acknowledgement field 614 contains a flag which indicates whether BPDU messages forwarded from this port should have their topology change acknowledgement flags 112 (FIG. 1) asserted. A Configuration BPDU field 616 contains a copy of the BPDU message that is to be forwarded from the respective port P, and TCN BPDU field 618 contains a copy of the TCN BPDU message that is to be forwarded from the port P.

The port data structure 600 may also contain a port next state field 620, a configuration BPDU in Process field 622, and a HA Recovery Pending field 624. The port next state field 620 is used to carry a new port state, pending acknowledgement from the respective line card. During this time, the port state field 604 continues to carry the prior port state. Once an acknowledgement is received, the port state field 604 is updated with the new port state. The configuration BPDU in Process field 622 is used as a locking mechanism to prevent the contents of the port data structure 600 from being processed more than once during any given processing cycle. The HA Recovery Pending field 624 is described below. Port data structure 600 may also include one or more fields for storing statistical data, such as port statistics field 626. A port data structure pointer field 628 contains a pointer to the next port data structure in the corresponding linked list.

Figure 4:
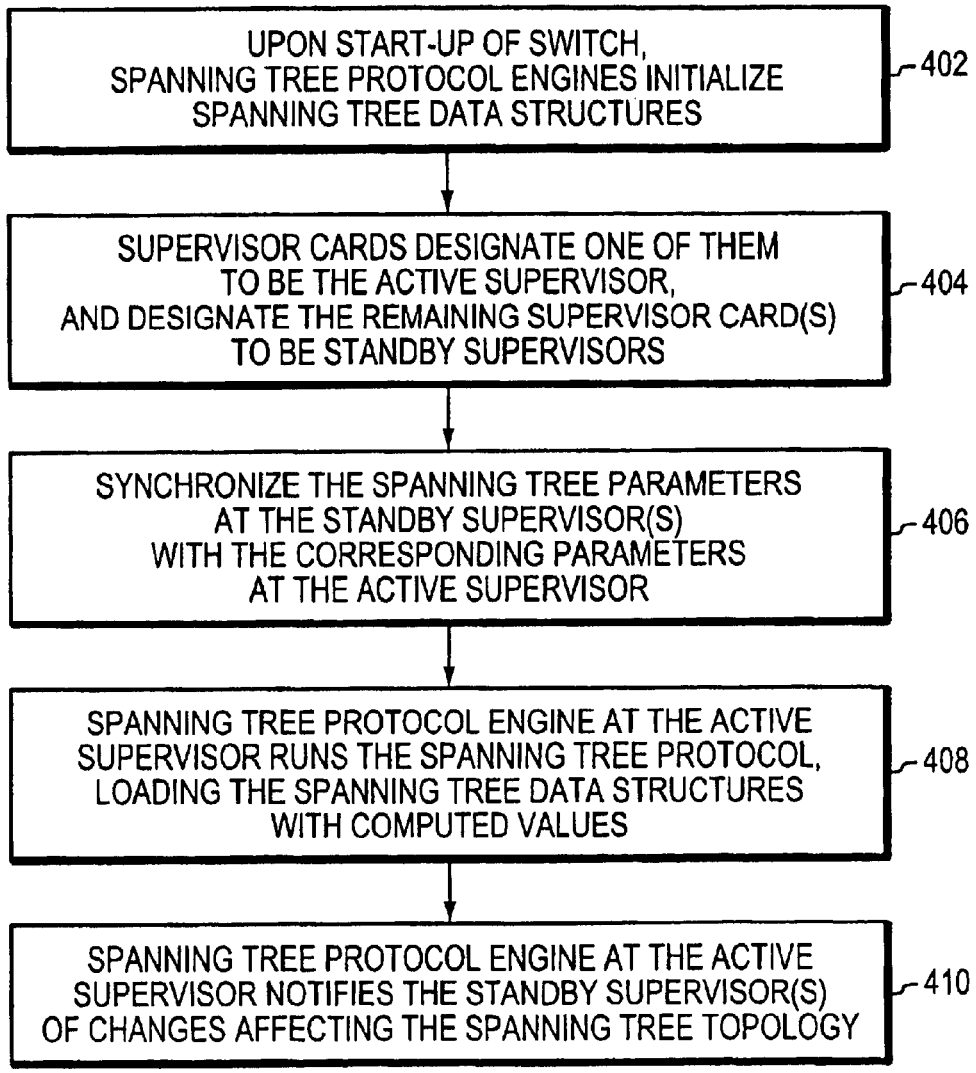
FIGS. 4 and 7–10 are flow diagrams of the methods of the present invention.

Based on the identity of the root, root port and designated ports, the active STP engine 328, through its constituent state machines 332, transitions the states of ports P among the spanning tree states (e.g., blocking, listening, learning and forwarding). This port state information, along with other information concerning the spanning tree topology (e.g., the state of a port, whether a port is in the topology or not, etc.) is passed to the standby supervisor 302, as indicated at block 410 (FIG. 4).

In the illustrative embodiment, an event-based communication architecture is used to pass information, including changes in port states, from the active supervisor 304 to the standby supervisor 302. More specifically, the active supervisor 304 issues events and the standby supervisor 302 receives and processes these events in order to keep certain fields of the port data structures at the standby supervisor 302 in synchronization with the port data structures at the active supervisor 304. Should a failure occur at the active supervisor 304, the standby supervisor 302 can then use the information from its port data structures, among other information, to resume operation of the spanning tree protocol with minimal disruption to the bridged network 200.

Basically, the active supervisor 304 utilizes one of three different events to notify the standby supervisor 302 of information relating to the computation of the spanning tree topology. These events include:

PORT_CHANGE_STATE;
ADD_DELETE_PORT; and
MOVE_PORT_TO_VLAN.

As described below, these events are passed from the active event manager 336 to the standby event manager 334, and the standby supervisor 302 responds by taking a particular action. For ease of explanation, these actions are described as being implemented by the standby STP engine 326. However, since the standby STP engine 326 is preferably in a dormant or sleeping mode, those skilled in the art will recognize that the described actions can be implemented by other processes that are currently running on the standby supervisor 302.

In accordance with this event-based communication scheme, the standby supervisor 302 first registers to receive events from the active supervisor 304. In particular, the event manager 334 on the standby supervisor 302 may have a static table (not shown) configured so that the standby supervisor 302 receives all events generated by the active supervisor 304. The standby 302 may then process received events which are of interest to it and discard all others. The STP engine 328 at the active supervisor 304, moreover, may issue an Application Programming Interface (API) system call, such as eventRegister( ), to event manager 336. The STP engine 328 may insert as one of the arguments to the eventRegister( ) API a callback or handle identifying itself. It may use additional arguments to specify the specific events or the general type of events for which it wants to be notified.

As part of its computation of the spanning tree protocol, the active STP engine 328 typically determines that a given port P of switch 226 should be transitioned to a new spanning tree port state. The active supervisor 304 not only directs the affected port to change its state, it also notifies the standby STP engine 326 of this change in port state through the PORT_CHANGE_STATE event.

Figure 7:
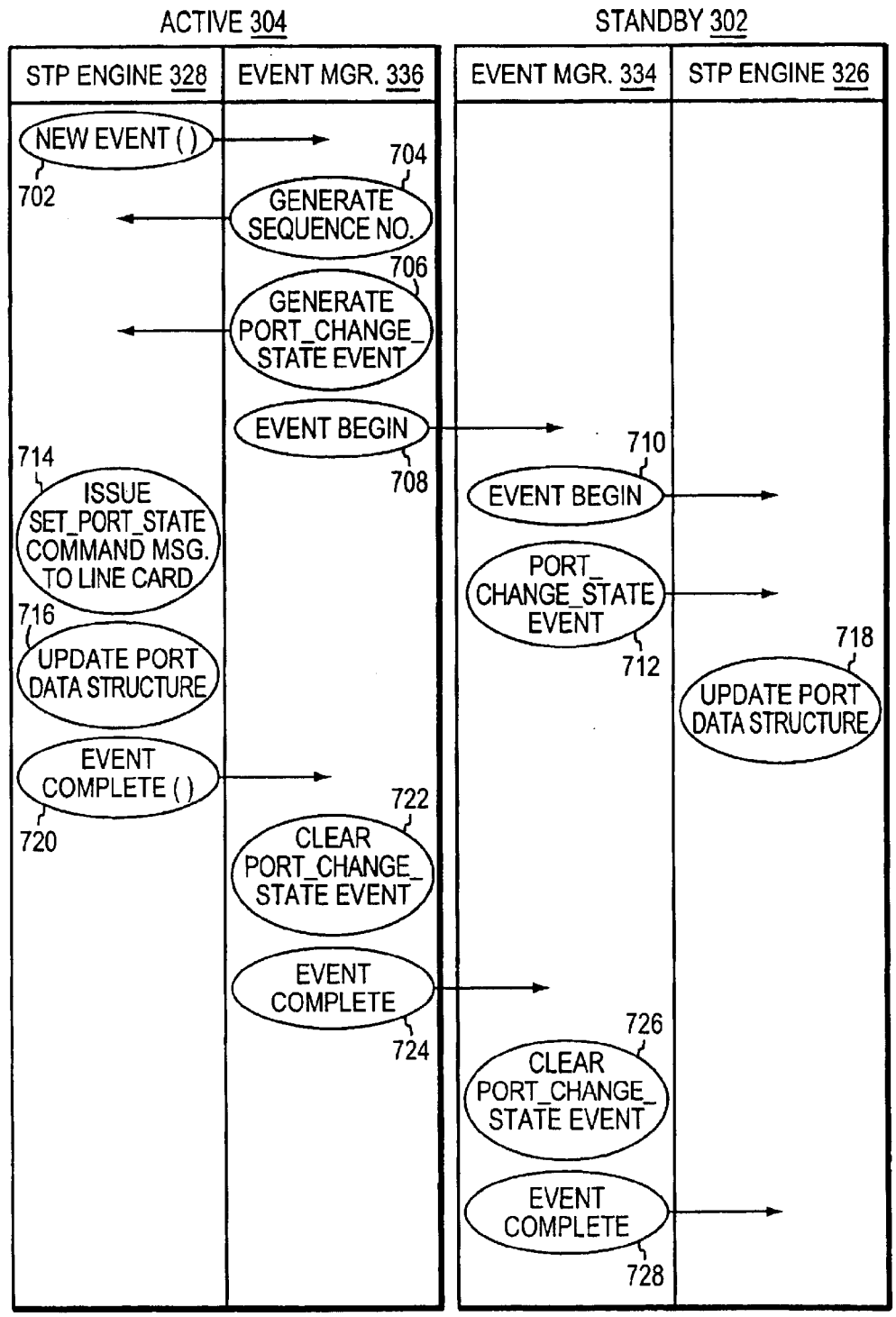

FIG. 7 is a flow diagram of the preferred steps for the PORT_CHANGE_STATE event. Suppose, for example, that the active STP engine 328 (FIG. 3) determines that port P3 at line card 308 should transition from the learning spanning tree port state to the forwarding state for the "red" VLAN designation. First, the active STP engine 328 issues a newEvent( ) API system call 702 to the event manager 336. The active STP engine 328 adds as arguments to the newEvent( ) API call 702 the type of event (i.e., port change state), the module or card at which the affected port is located (i.e., line card 308), the port (i.e., port P3), the VLAN designation (i.e., red) for which the port is changing state, and the new state (i.e., forwarding). In response to the newEvent( ) API 702, the event manager 336 generates and returns a sequence number, e.g., "1", as indicated at 704, to the active STP engine 328. The sequence number uniquely identifies this port state change event.

After generating the sequence number, the event manager 336 next creates a PORT_CHANGE_STATE event 706, which may also be returned to the STP engine 328. The PORT_CHANGE_STATE event 706 contains the identity of the line card, the port number, the VLAN designation, the new state and the sequence number associated with this port state change. Since the event manager 334 at the standby supervisor 302 is configured to receive all events generated by the active event manager 336, the active event manager 336 notifies it of the PORT_CHANGE_STATE event 706. For example, the active event manager 336 may generate and send an eventBegin message 708 to the standby event manager 334 via the common bus 320. The eventBegin message 708 may include the type of event (e.g., PORT_CHANGE_STATE), the identity of the line card, the port number, the VLAN designation, the new state and the sequence number associated with this port state change. The standby event manager 334, in turn, notifies the standby STP engine 326 of the eventBegin message, as indicated at 710. The standby event manager 334 also creates a corresponding PORT_CHANGE_STATE event 712, based on the eventBegin message 708 from the active event manager 326, and stores the respective sequence number.

The active STP engine 328 then directs line card 308 to transition port P3 from learning to forwarding. In particular, the active STP engine 328 may issue a SET_PORT_STATE command message to the line card 308 via common bus 320, as indicated at 714. The SET_PORT_STATE command message identifies the port whose state is being changed, the corresponding VLAN designation and the new state (i.e., forwarding). The SET_PORT_STATE command message also contains the unique sequence number (e.g., "1") associated with this particular port state change. Next, the active STP engine 328 updates the corresponding field of the respective port data structure 600 at run-time memory 344 with the new port state (e.g., forwarding), as indicated at 716. That is, the active STP engine 328 changes the contents of the port state field 604 of the corresponding port data structure 600 from learning to forwarding.

Upon learning of the PORT_CHANGE_STATE event, the standby STP engine 326 similarly updates its copy of the port data structure, as indicated at block 718. That is, the standby STP engine 326 changes the contents of the port state field 604 of the corresponding port data structure 600 from leaning to forwarding. In the preferred embodiment, the standby STP engine 326 does not change any other fields of the corresponding port data structure 600.

After updating the port data structure, the active STP engine 328 issues an eventComplete( ) API call 720 to the event manager 336, signaling that it has performed all of the actions associated with the respective event. In response, the active event manager 336 clears the PORT_CHANGE_STATE event, as indicated at 722, and sends an eventComplete message 724 to the standby event manager 334. In response to the eventComplete message 724, the standby event manager 334 clears the PORT_CHANGE_STATE event, as indicated at 726. The standby event manager 334 also sends an eventComplete message 728 to the standby STP engine 326, notifying it that the PORT_CHANGE_STATE event has been completed.

Upon receiving the SET_PORT_STATE command message, line card 308 stores the new port state in its respective LTL memory, and the corresponding sequence number (e.g. "1") preferably in a dynamic memory at the line card 308.

This process of issuing PORT_CHANGE_STATE events and up-dating the port data structures 600 on both the active and standby supervisors 304, 302 is repeated as the ports P at switch 226 are transitioned among the spanning tree port states by the active STP engine 328. Suppose, for example, that the state of a port P on line card 306 is changed. The active STP engine 328 asks the active event manager 336 to create a new PORT_CHANGE_STATE event. This new PORT_CHANGE_STATE event, moreover, is preferably assigned sequence number "2". That is, the sequence numbers are preferably incremented (or decremented) by the active event manager 336. In response to the corresponding SET_PORT_STATE command message, line card 306 will store sequence number "2". When the next PORT_CHANGE_STATE event is generated, the active event manager 336 will return sequence number "3". Suppose this third PORT_CHANGE_STATE affects a port P on line card 308. Upon receiving the corresponding SET_PORT_STATE command message with sequence number "3", line card 308 replaces its previously stored sequence number "1" with the new sequence number "3". That is, each line card 306, 308 preferably stores only the last sequence number that it has received from the active STP engine 328. Thus; at this point in time, the sequence number stored at line card 306 is "2" while the sequence number stored at line card 308 is "3".

Once the active topology (or topologies) have been established within computer network 200 (FIG. 2), messages may be forwarded by the switches 220–226. As messages are received by switch 226, the EARL 314 at the active supervisor 304, as well as the EARL 314 at the standby supervisor 302, stores address information regarding the network entities of network 200 in its respective forwarding table 318.

Figure 8:
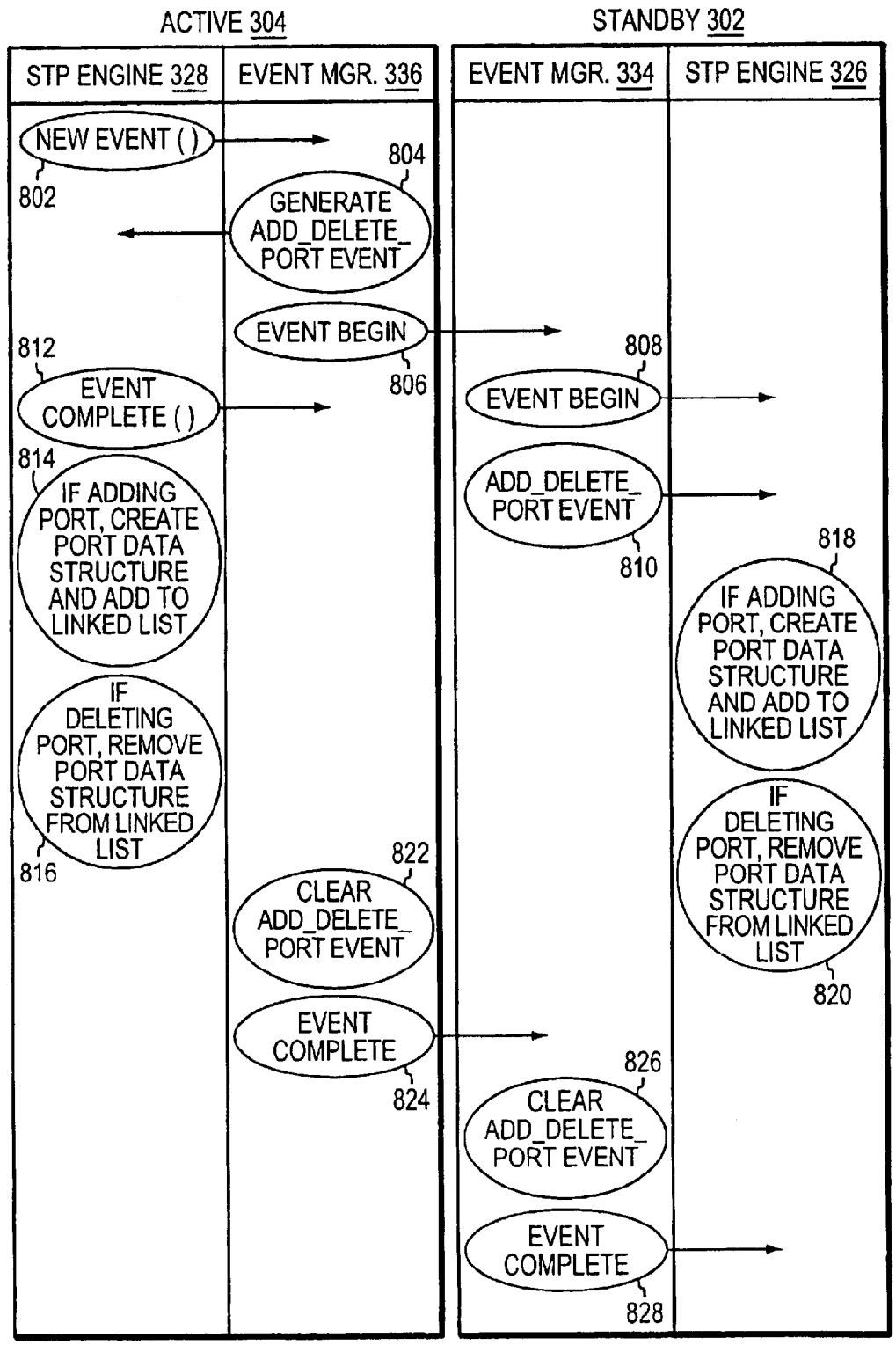

FIG. 8 is a flow diagram for the ADD_DELETE_PORT event, which is used to ins form the standby supervisor 302 that a port has either been added to or removed from the spanning tree protocol. For example, suppose a network administrator disables port P2 at line card 306 in connection with a particular VLAN designation (e.g., "green"). In response, the active STP engine 328 issues a newEvent( ) API system call 802 to the event manager 336. The arguments of this newEvent( ) API are the type of event, the module at which the affected port is located (i.e., line card 306), the port (i.e., port P2), the VLAN designation (i.e., green), and a flag signifying whether the port is being added or removed from the spanning tree. If the flag is set to TRUE or is asserted, then the port is to be deleted. Otherwise, the port is to be added. In response to the newEvent( ) call 802, the active event manager 336 generates an ADD_DELETE_PORT event, as indicated at 804, and returns it to the STP engine 328. The active event manager 336 also generates and sends an eventBegin message 806 to standby event manager 334 via the common bus 320. The standby event manager 334, in turn, passes an eventBegin message 808 (which may be the same message) to the standby STP engine 326, generates an ADD_DELETE_PORT event, as indicated at 810, and also passes this event to the standby STP engine 326.

After issuing the newEvent( ) call 802 and learning of the ADD_DELETE_PORT event 804, the active STP engine 328 issues an eventComplete( ) API call 812 to the active event manager 336, and takes the appropriate action. In particular, if the port is being added, the active supervisor 304 creates a new port data structure 600 for the port and adds this new data structure 600 to the linked list of port data structures 600 for the entry of the VLAN table corresponding to the identified VLAN designation (i.e., green), as indicated at 814. If the port is being deleted, the active STP engine 328 removes the corresponding port data structure 600 from the corresponding linked list, as indicated at 816. At the standby supervisor 302, the standby STP engine 326 takes a similar action in response to the ADD_DELETE_PORT event 810. That is, the standby STP engine 326 either creates a new port data structure 600 and adds it to the linked list of port data structures 600 for the green VLAN, as indicated at 818, or removes the corresponding port data structure 600 from the corresponding linked list, as indicated at 820.

In response to the eventComplete( ) API call 812, the active event manager 336 clears the corresponding ADD_DELETE_PORT event, as indicated at 822, and sends an eventComplete message 824 to the standby event manager 334. The standby event manager 334, in turn, clears the corresponding ADD_DELETE_PORT event, as indicated at 826, and notifies the standby STP engine 326 by sending it an eventComplete message 828.

It should be understood that the active STP engine 328 may alternatively issue the eventComplete( ) API call 812 after taking the appropriate action of blocks 814, 816.

Figure 9:
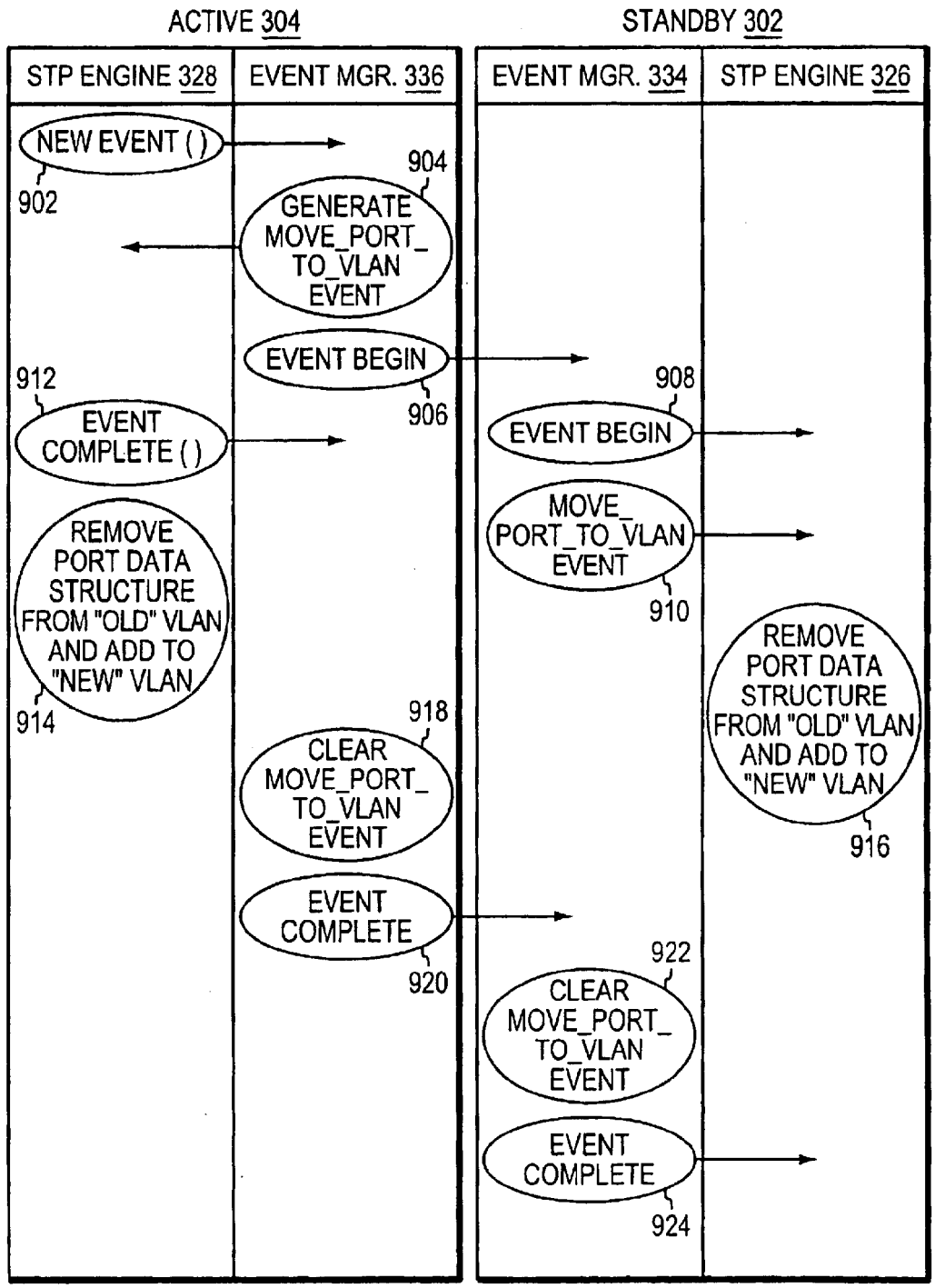

FIG. 9 is a flow diagram regarding the MOVE_PORT_TO_VLAN event. This event is used to inform the standby supervisor 302 that a port has changed VLAN associations. The active STP engine 328 may learn of a VLAN change from the network administrator action. Suppose, for example, that the active STP engine 328 learns that port P0 at line card 308 is being moved from the red VLAN designation to the blue VLAN designation. First, the active STP engine issues a newEvent( ) API call 902 to the active event manager 336. The arguments of this call are the type of event, the module or card upon which the affected port is located (i.e., line card 308), the identity of the port (i.e., P0), the old VLAN designation (i.e., red) and the new VLAN designation (i.e., blue). In response to the newEvent( ) call 902, the active event manager 336 generates a MOVE_PORT_TO_VLAN event and returns it to the STP engine 328, as indicated at 904. The active event manager 336 then sends an eventBegin message 906 to the standby event manager 334 via the common bus 320. The standby event manager 334, in turn, sends an eventBegin message 908 to the standby STP engine 326 and also generates a MOVE_PORT_TO_VLAN event, which may similarly be provided to the standby STP engine 326, as indicated at 910.

The active STP engine 328 next issues an eventComplete( ) API call 912 to the active event manager 336, and carries out the corresponding action. More specifically, the active STP engine 328 removes the affected port data structure 600 from the linked list for the old VLAN designation (i.e., red), and inserts the port data structure into the linked list for the new VLAN designation (i.e., blue), as indicated at 914. The standby supervisor 302 takes similar action upon receiving the eventBegin message 908 and the MOVE_PORT_TO_VLAN event 910, as indicated at 916.

In response to the eventComplete( ) call 912, the active event manager 336 clears the MOVE_PORT_TO_VLAN event, as indicated at 918, and sends an eventComplete message 920 to the standby event manager 334. The standby event manager 334, in turn, clears the event, as indicated at 922, and sends an eventComplete message 924 to the standby STP engine 326.

As shown above, sequence numbers are not generated for or utilized by the ADD_DELETE_PORT or the MOVE_PORT. TO_VLAN events. The active event manager 336 preferably generates sequence numbers only in response to PORT_CHANGE_STATE events. Furthermore, the active supervisor 304 does not notify the standby supervisor 302 of the election of a particular bridge as the root or of the election of a particular port as a designated port for a given LAN. As far as spanning tree information is concerned, the standby supervisor 302 is only informed of changes in port states.

Switchover from Active to Standby Supervisors

Figure 10A:
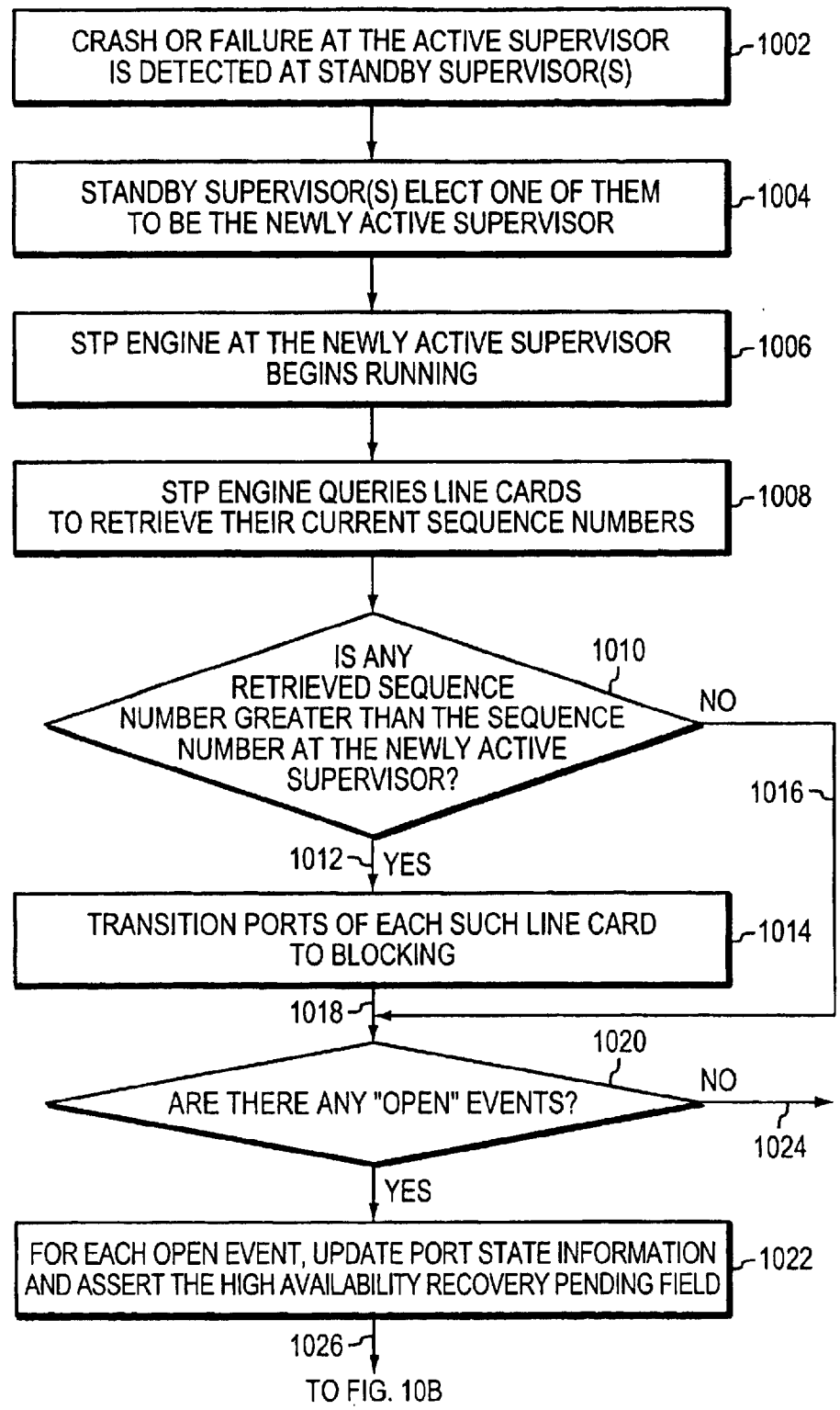
Figure 10B:
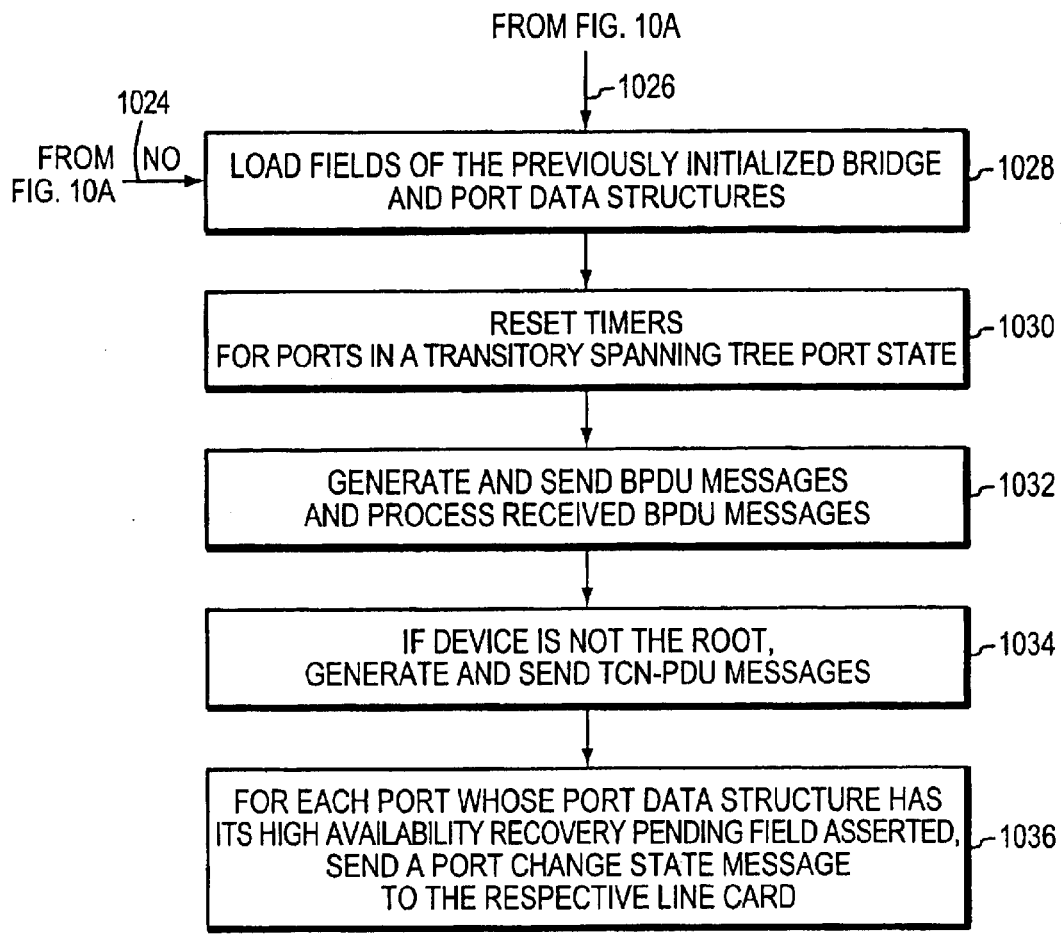

If a failure occurs at the active supervisor 304, the standby supervisor 302 preferably continues operation of the spanning tree protocol with little or no disruption to the bridged network 200. FIGS. 10A and 10B are a flow diagram of the preferred steps taken by switch 226 during a switchover of supervisor cards. First, the active supervisor 304 crashes or fails, and that crash or failure is detected by the failure detection modules, e.g., module 338, at the standby supervisors, e.g., supervisor 302, as indicated at block 1002 (FIG. 10A). If there are multiple standby supervisors, one of them is elected to be the newly active supervisor, as indicated at block 1004. The STP engine 326 at the standby supervisor 302 is then activated, as indicated at block 1006. As described above, the standby STP engine 326 partially initialized the data structures it needs to run the spanning tree protocol (i.e., the VLAN table, the bridge data structures and the port data structures). Accordingly, the standby STP engine 326 need not initialize any data structures at this point. The standby STP engine 326 does, however, perform a "consistency check" with the line cards 306, 308 to see whether its understanding of the spanning tree state of the ports P at switch 226 agrees with the line cards 306, 308.

In particular, the standby STP engine 326 queries each line card 306, 308 to retrieve the last sequence number stored at each the line card 306, 308, as indicated at step 1008. The standby STP engine 326 then compares the retrieved sequence numbers to the last sequence number stored by standby STP engine 326. More specifically, the standby STP engine 326 determines whether any of the sequence numbers from the line cards 306, 308 is greater than its sequence number, as indicated at decision block 1010. Suppose, for example, that the last sequence number provided to the standby STP engine 326 before the active supervisor 304 crashed was sequence number "21". If the sequence number stored at each of the line cards 306, 308 is less than or equal to this sequence number (i.e., "21"), then the standby STP engine 326 "knows" that the spanning tree port state information stored at the line cards 306, 308 is consistent with the spanning tree port state information stored in the port data structures 600 at the standby's run-time memory 342. If, however, a line card, such as line card 308, returns a sequence number (e.g., "22") that is greater than the sequence number at the standby STP engine 326, then the STP engine 326 concludes that at least one port state change message sent to this line card was not received by the standby STP engine 326. Since the standby STP engine 326 cannot "recover" this port state change, it preferably responds by directing the respective line card (i.e., line card 308) to transition all of its ports P to the blocking spanning tree port state, as indicated by Yes arrow 1012 leading to block 1014.

Following the "consistency check" and the transition of those ports that failed the consistency check to blocking, the standby STP engine 326 next proceeds to determine whether there are any "open" events at the standby event manager 334, as indicated by No arrow 1016 and line 1018 which both lead to decision block 1020. In particular, the standby STP engine 326 queries the standby event manager 334 to see if any PORT_CHANGE_STATE events have been opened, typically as a result of the eventBegin messages, but not cleared before the active supervisor 304 crashed or failed. In other words, the standby STP engine 326 looks for any PORT_CHANGE_STATE events for which no eventComplete messages were received by the standby supervisor 302. If so, the standby STP engine 326 retrieves the still open PORT_CHANGE_STATE event from the standby event manager 326, updates the port state field 604 and asserts the High Availability (HA) Recovery Pending field 624 for this port data structure 600 for the respective port data structure 600 in its run-time memory 342, as indicated at block 1022. The standby STP engine 326 asserts the HA Recovery Pending field 624 basically as a reminder to the standby STP engine 326 that it must instruct the corresponding line card to update the spanning tree state of the subject port P.

After updating the port state fields 604 and setting the respective HA Recovery Pending fields 624 for all open PORT_CHANGE_STATE events (or determining that there are no open PORT_CHANGE_STATE events), the standby STP engine 326 loads (i.e., fills in) fields 502–520 of the bridge data structures 500 and fields 602–612 of the port data structures 600 in its run-time memory 342, as indicated by No arrow 1024 and line 1026 which both lead to block 1028 (FIG. 10B). The standby supervisor 302 loads these fields assuming that it (i.e., switch 226) is the root for each VLAN designation in the bridged network 200. In other words, the standby STP engine 326 retrieves the spanning tree parameter information from its non-volatile memory 346 and uses this information to load the respective fields of the bridge and port data structures 500, 600. For example, in the root bridge ID field 502 of the bridge data structures 500, and in the designated bridge ID field 606 of the port data structures 600, the standby STP engine 326 loads its own (i.e., the switch's) numeric identifier. In addition, for those ports P that are in a transitory spanning tree state (e.g., listening or learning), the standby STP engine 326 resets or re-initializes the forward delay timers associated with these ports P, as indicated at block 1030.

Upon loading the fields of the bridge and port data structures, 500, 600, the standby STP engine 326 begins generating BPDU messages for transmission from the ports P of switch 226 and processing any BPDU messages that are received by switch 226 from neighboring switches, as indicated at block 1032. In particular, the standby STP engine 326 generates tagged BPDU messages based on the information its bridge and port data structures 500, 600. In other words, the fields of these BPDU messages 100 are loaded as though switch 226 is the root of the bridged network 200 for all VLAN designations. For example, the root ID field 116 (FIG. 1) of all BPDU messages generated and forwarded by the standby STP engine 326 contains the numeric bridge ID for switch 226, and the message age field 124, maximum age field 126, hello time field 128 and forward delay field 130 all contain the corresponding default parameters stored at its non-volatile memory 346.

Significantly, the standby STP engine 326 asserts the TC flag field 114 of all BPDU messages 100 that it initially generates and sends from the ports P of switch 226. In response to receiving BPDU messages from switch 226, the neighboring devices (e.g., switches 220, 222 and 224) reply with BPDU messages of their own, assuming these neighboring devices know of "better" BPDU information than that contained in the messages from switch 226. Suppose, for example, that the bridged network 200 supports the red, blue and green VLAN designations, and that switch 224 is the root for the red VLAN designation and that switch 220 is the root for the blue and green VLAN designations. In other words, switch 226 is not a root for any of the VLAN designations of the bridged network 200. In this case, switch 226 is likely to receive BPDU messages from its neighbors.

The standby STP engine 326, in a conventional manner, processes these received BPDU messages. In particular, the standby STP engine 326 determines whether the received BPDU messages contain "better" spanning tree information than that currently known by it. If so, the standby STP engine 326 adopts this better information and stops sending BPDU messages from the ports on which this better information was received. The standby STP engine 326 also loads the corresponding bridge and port data structures 500, 600 with the better spanning tree information. For example, upon receiving BPDU messages from switch 224, the standby STP engine 326 will load the bridge ID for switch 224 in the root bridge ID field 502 for the corresponding bridge data structure 500.

For those VLAN designations for which switch 226 is not the root of the bridged network 200, the standby STP engine 326 generates and begins sending Topology Change Notification protocol data unit (TCN-PDU) messages from the respective root port for each such VLAN designation, as indicated at block 1034. As mentioned above, with conventional operation of the spanning tree protocol, a bridge only transmits TCN-PDU messages in response to a change in the active topology. With the present invention, however, switch 226 is configured so as to transmit TCN-PDU messages whenever a failover occurs and the standby STP engine 326 learns that it is not the root for at least one VLAN designation. This is preferably done in case switch 226 was responding to a topology change at the time of the crash or failure. It is also preferably done in case a topology change occurred during the transition from the active supervisor 304 to the standby supervisor 302, since the assertion of the TC flag field 114 in the BPDUs sourced by switch 226, as described above, is ignored by the neighboring devices. Thus, switch 226 must transmit TCN-PDU messages in order to cause the other switches in the bridged network 200 to shorten their filtering database timers.

These TCN-PDU messages are propagated hop-by-hop to the root in a conventional manner. The root then responds by asserting the TC flag field 114 (FIG. 1) in all subsequent BPDU messages sourced by the root. Upon receiving a BPDU message that originated from the root and has its TC flag field 114 asserted, a switch lowers the timer(s) associated with the addresses in its filtering database to the forward delay time in field 130 of the BPDU message. Accordingly, the switches quickly age out their address information. Switch 226 stops transmitting TCN-PDU messages as soon as it receives from the upstream switch a BPDU message whose TCA flag field 112 is asserted, thereby confirming receipt of the TCN-PDU message from switch 226.

If switch 226 is the root for a VLAN designation, there is no need to send TCN-PDU messages, because the standby STP engine 326 already asserted the TC flag field 114 in the BPDU messages that it sourced for this VLAN designation, as described above. Accordingly, the neighboring switches have already lowered the age-out time associated with their filtering databases for this VLAN designation in response to receiving these BPDU messages.

By sending out BPDU messages as soon as its ready to do so, and thus triggering its neighboring devices to respond with their own BPDU messages, the standby STP engine 326 can quickly determine which bridge is the root for each VLAN designation in the bridged network 200.

In addition to generating and sending BPDU messages, processing received BPDU messages and generating and sending TCN-PDU messages, as necessary, the standby STP engine 326 also scans the port data structures 600 looking for data structures 600 whose HA Recovery Pending field 624 is asserted. As described above, the standby STP engine 326 asserted this field as part of the failover procedure whenever it found an open PORT_CHANGE_STATE event. For every port data structure 600 whose HA Recovery Pending field 624 is asserted, the standby STP engine 326 sends a SET_PORT_STATE command message to the corresponding line card to change the state of the port to the state specified in the port state field 604 of the respective port data structure 600, as indicated at block 1036.

When the line card receives this SET_PORT_STATE message, it changes the state of the port to the state specified in the message. Even if the line card had received a SET_PORT_STATE command message from the active supervisor 304 before it failed and thus already changed the port's state, the re-sending of this message by the standby supervisor 302 is harmless. The standby STP engine 326 preferably utilizes a sequence number that is larger than the largest sequence number of which it is aware in such command messages (e.g., STP engine 326 may increment by "1" the sequence number stored in its memory).

As shown, only open PORT_CHANGE_STATE events are acted upon by the standby supervisor 302. Any open ADD_DELETE PORT and/or MOVE_PORT_TO_VLAN events are simply ignored by the standby supervisor 302. These two events may be safely ignored because the standby supervisor 302 already took the specified action. That is, the standby supervisor 302 takes the specified action for these two events in response to the corresponding eventBegin messages, as described above. Thus, no further action needs to be taken in response to a crash or failure at the active supervisor 304 after it has issued the newEvent( ) call for these two events. Unlike the ADD_DELETE_PORT and the MOVE_PORT_TO_VLAN events, the standby supervisor 302 does not take the specified action for PORT_CHANGE_STATE events until it receives the eventBegin message 710 and/or is notified of the PORT_CHANGE_STATE event 712. Thus, if a crash or failure occurs before the active supervisor 304 is able to issue the eventComplete( ) call, the standby supervisor 302 has no way of knowing how far along the active supervisor 304 got before it crashed or failed (e.g., whether or not the active supervisor 304 sent the SET_PORT_STATE command message to the line card).

The standby STP engine 326 preferably delays the transmission of SET_PORT STATE command messages, as described above, because of the time it typically takes to send command messages (and receive acknowledgements) across the common bus 320. Rather than spend time sending such messages to the line cards immediately following the failover, the standby supervisor 302 generates, sends and processes BPDUs messages to prevent the other switches from detecting a failure and causing the entire active topology to be re-computed. Those skilled in the art will recognize that if switch 226 includes a low latency message channel from the supervisors 302, 304 to the line cards 306, 308, then there may be no need to delay the transmission of the SET_PORT_STATE command messages. In this case, the addition of the HA Recovery Pending field 624 to the port data structures 600 may also be unnecessary.

While the standby STP engine 326 is loading its bridge and port data structures 500, 600 with the information from its non-volatile memory 346 and sending and processing BPDU messages, the line cards 304, 308 (and the standby supervisor 302 to the extent it has its own ports P) rely on the spanning tree states of their ports P as stored in their LTL memories for purposes of forwarding messages within the bridged network 200. More specifically, suppose line card 304 passes the consistency check and that ports P0 and P1 at line card 304 are both associated with the green VLAN designation and are both in the forwarding state. Since the line card 304 passed the consistency check, the standby STP engine 326 does not instruct it to change the spanning tree states of its ports P, despite the crash of the active supervisor 304. In other words, even though the standby STP engine 326 does not know which bridge is the root for the green VLAN designation, and assumes, at least initially that it is the root, it does not transition the states of ports P0 and P1 to blocking or listening, as in the prior art systems. Thus, ports P0 and P1 continue to accept messages from and forward messages to the bridged network 200, while the standby STP engine 326 determines who is the actual root for the green VLAN bridged network. The EARL 314 at the standby supervisor 302, moreover, which continued to learn and store address information while supervisor 304 was running, can forward messages from the appropriate ports P. Accordingly, despite a failure or crash at the active supervisor 304 and a transition of spanning tree operation to the standby supervisor 304, time-sensitive traffic flows, such as voice and/or video, suffer little if any disruptions.

Hot-Swapping of Supervisor Cards

The present invention is also able to support the hot swapping of supervisor cards. The term hot swapping refers to the replacement of components, in this case supervisor cards, without having to shut-down and restart the affected equipment, in this case the switch. To facilitate hot-swapping and the re-starting of failed or crashed supervisor cards, such as card 304, each supervisor card 302, 304 initializes a port database array data structure for each VLAN designation at its run-time memory 342, 344.

Figure 11:
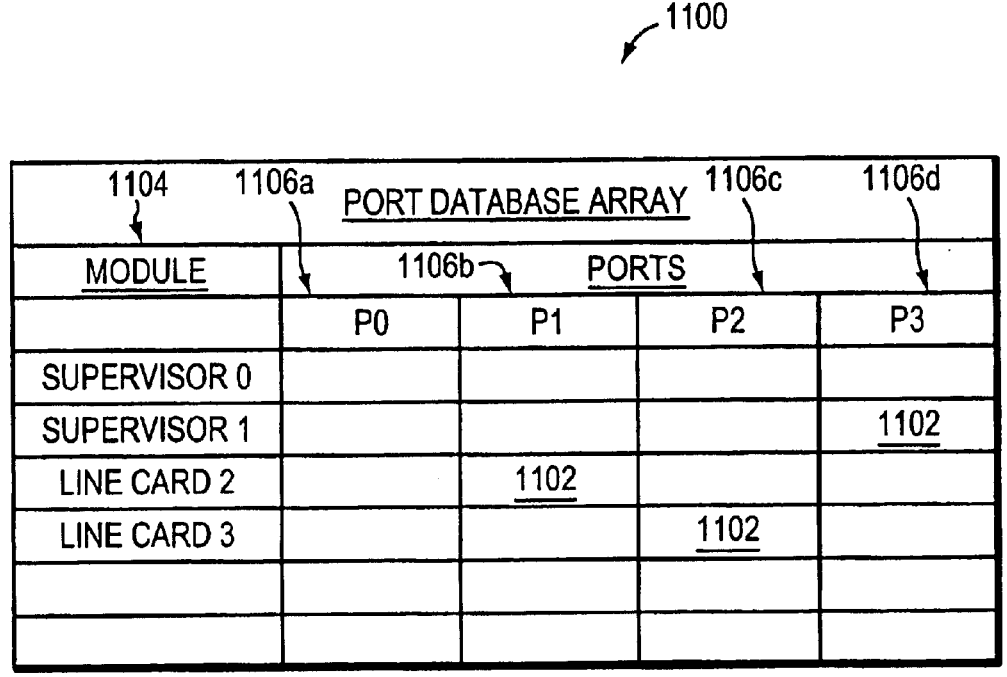

FIG. 11 is a highly schematic illustration of a preferred port database array 1100 for a given VLAN designation (e.g., red). The array 1100 preferably includes a plurality of columns and rows that identify corresponding cells or data elements 1102. In particular, a first column 1104 is used to identify all of the modules or cards, e.g., supervisor an line cards, that have been installed on switch 226 and have ports P for forwarding and receiving network messages. Array 1100 also includes a plurality of port columns 1106a–d that identify the respective ports, e.g., ports P0–P3, at the modules listed in column 1102. Thus, a corresponding cell 1102 exists for each port P on each module or card of switch 226. As described below, cells 1102 contain information regarding the current spanning tree port state, e.g., blocking, listening, etc., of the respective port P. In the preferred embodiment, the port database array 1100 is a bitmap where each cell is a port.

To conserve memory storage space, the cells 1102 of each port database array 1100 are only 2 bits wide. A code is used to associate the contents of each cell with a corresponding spanning tree port state. For example, "00" may correspond to the port P not existing in the spanning tree database, "01" may correspond to the port P being disabled, "10" to the port being in any of the blocking, listening, or learning spanning tree port states, and "11" may correspond to the port being in the forwarding state. As the active STP engine 328 transitions the ports P of the switch 226 among the various spanning tree states, it updates the corresponding cells 1102 for these ports in the port database arrays 1100 with the appropriate two-bit code, in addition to updating the port state fields 604 of the corresponding port data structures 600. The standby supervisor 302 also updates the corresponding cells 1102 of its port data base arrays 1102 and the port state fields 604 of its port data structures 600.

Suppose, for example, that the standby supervisor 302 fails and is hot-swapped with a new standby supervisor. Upon installation of the new standby supervisor, which will also be referred to by designation number 302 for simplicity, the active supervisor 304 first sends the standby 302 all of the VLAN information for the network. That is, the active supervisor 304 informs the standby of all of the VLAN designations currently implemented within the bridged network 200. In response, the standby supervisor 304 initializes a VLAN table, as described above. Next, the active supervisor 304 synchronizes its port database arrays 1100 to the new standby supervisor 302. That is, the active supervisor 304 informs the standby supervisor 302 of the particular contents of the port database arrays 1100 at the active supervisor 304.

The standby supervisor 302 then uses this information to fill-in the cells 1102 of its arrays 1100. Based on the contents of its port database arrays 1100, the standby supervisor 302 then initializes the appropriate bridge and port data structures 500, 600 and loads the port state fields 604 of the port data structures 600. That is, if ports P1 and P2 at line card 308 are associated with the green VLAN and are in the forwarding state, as reflected by the information in the corresponding port database array 1100, the standby supervisor 302 adds port data structures 600 for these two ports P1 and P2 to the linked list of port data structures 600 for the green VLAN designation entry of its VLAN table. The standby supervisor 302 also sets the corresponding port state fields 604 to reflect that these two ports are in the forwarding state for this VLAN designation.

As shown, the standby supervisor 302 can create the appropriate bridge and port data structures 500, 600 on is own based on the contents of the port database arrays 1100 from the active 304. This conserves significant messaging bandwidth, processor resources and time at the active supervisor 304.

It should be understood that the STP engines 326, 328 and their consistent state machines 330, 332 may be configured to transition the ports P of switch 226 among additional and/or other spanning tree port state besides blocking, listening, learning and forwarding. For example, they may be further configured to transition the ports P among the Forgetting, Forwards, and Forwarder states, as described in IEEE draft standard 802.1w/D1 (Jul. 2, 1999), as well.

The foregoing description has been directed to specific embodiments of this invention. It will be apparent, however, that other variations and modifications may be made to the described embodiments, with the attainment of some or all of their advantages. For example, other communication architectures or paradigms, besides event-based architectures, such as primitives, commit protocols, etc., may be employed by the active and standby supervisor cards to exchange information relating to the spanning tree protocol. In another embodiment, the bridged network 200 may not support virtual LANs. In this case, the supervisors would not initialize or maintain a VLAN table and would have a single bridge data structure and one port data structure per port P at the switch 226. The events and API calls, moreover, would not need to include the identity of the corresponding VLAN designation. Therefore, it is an object of the appended claims to cover all such variations and modifications as come within the true spirit and scope of the invention.

What is claimed is:

1. In an intermediate network device having a plurality of ports for forwarding messages in a computer network and two or more supervisors, each supervisor including at least one spanning tree protocol (STP) engine configured to transition the ports of the device among a plurality of spanning tree port states, a method for continuing operation of a spanning tree protocol despite crashes or failures, the method comprising the steps of:

designating a first supervisor to be an active supervisor and a second supervisor to be a standby supervisor for the network device;

running the spanning tree protocol at the active supervisor such that the STP engine at the active supervisor elects at least one root of the computer network and directs the ports to transition among the spanning tree port states;

storing the spanning tree port states of the ports at the standby supervisor;

in response to a failure at the active supervisor, running the spanning tree protocol at the standby supervisor; and utilizing the stored spanning tree port states of the ports at the standby supervisor to run the spanning tree protocol at the standby supervisor.

2. The method of claim 1 further comprising the step of informing the standby supervisor whenever a port is transitioned from a first spanning tree port state to a second spanning tree port state by the active supervisor.

3. The method of claim 1 further comprising the steps of:

storing the spanning tree port states at the ports;

executing a consistency check between the spanning tree port state information at the newly active supervisor and the spanning tree port state information at the ports.

4. The method of claim 3 further comprising the steps of:

leaving all ports that pass the consistency check in their current spanning tree port state; and transitioning all ports that fail the consistency check to a non-forwarding spanning tree port state.

5. The method of claim 4 further comprising the step of, in response to the failure at the active supervisor, designating the standby supervisor to be a newly active supervisor for the network device.

6. The method of claim 1 further comprising the step of identifying the at least one root of the computer network by the standby supervisor following the failure of the active supervisor.

7. The method of claim 6 further comprising the step of, if the network device is not the at least one root, generating and forwarding one or more topology change notification protocol data unit (TCN-PDU) messages.

8. The method of claim 2 wherein the step of informing comprises the steps of:

generating, at the active supervisor, a port change state event in response to determining that a given port is to transition from a first spanning tree port state to a second spanning tree port state;

associating the port change state event with a corresponding sequence number;

notifying the given port of the corresponding sequence number when the active supervisor directs the given port to change spanning tree port states; and storing, at the given port, the sequence number.

9. The method of claim 8 further comprising the steps of:

notifying the standby supervisor of the port change state event and the sequence number; and storing, at the standby supervisor, the second spanning tree port state for the given port and the corresponding sequence number.

10. The method of claim 9 wherein the step of executing the consistency check comprises the step of comparing the one or more sequence numbers stored by the ports with the sequence number stored by the standby supervisor.

11. The method of claim 9 further comprising the steps of:

clearing each port change state event upon directing the given port to change spanning tree port states;

in response to the failure at the active supervisor, designating any port change state events not cleared by the failed active supervisor as open events; and for each open event:
storing, at the standby supervisor, the second spanning tree port state for the given port; and
directing the given port to change spanning tree port states as specified in the open event.

12. The method of claim 1 wherein, in response to the failure at the active supervisor, the standby supervisor elects the at least one root and directs the ports to transition among the spanning tree port states.

13. The method of claim 12 wherein the step of running the spanning tree protocol at the standby supervisor comprises the steps of:
generating a plurality of configuration bridge protocol data unit (BPDU) messages; and
forwarding the BPDU messages from the ports of the network device, wherein the BPDU messages include a Topology Change (TC) flag field, and the TC flag field is asserted.

14. The method of claim 4 wherein the non-forwarding spanning tree port state of the transitioning step is one of blocking and listening spanning tree port states.

15. The method of claim 4 wherein the steps of executing and identifying are each performed by the standby supervisor.

16. The method of claim 1 free from informing the standby supervisor of the at least one root elected by the active supervisor.

17. An intermediate network device for use in a computer network, the intermediate network device comprising:
a plurality of ports for forwarding messages;
a first supervisor having at least one spanning tree protocol (STP) engine configured to transition the ports of the device among a plurality of spanning tree port states;
a second supervisor having at least one STP engine configured to transition the ports of the device among a plurality of spanning tree port states;
means for designating the first supervisor to be an active supervisor and the second supervisor to be a standby supervisor such that the STP engine at the active supervisor elects at least one root of the computer network and directs the ports to transition among the spanning tree port states; and
means for storing the spanning tree port states of the ports at the standby supervisor.

18. The intermediate network device of claim 17 further comprising means for informing the standby supervisor whenever a port is transitioned from a first spanning tree port state to a second spanning tree port state by the active supervisor.

19. The intermediate network device of claim 17 further comprising:
means, disposed at the standby supervisor, for detecting a crash or failure at the active supervisor; and
means, responsive to a crash or failure at the active supervisor, for running the spanning tree protocol at the standby supervisor utilizing the spanning tree port states stored at the standby supervisor.

20. The intermediate network device of claim 19 further comprising means, responsive to a crash or failure at the active supervisor, for designating the standby supervisor to be a newly active supervisor, whereby, in response to the crash or failure at the active supervisor, the newly active supervisor elects the at least one root and directs the ports to transition among the spanning tree port states.

21. The intermediate network device of claim 18 wherein the informing means comprises:

a first event manager disposed at the active supervisor, the first event manager configured to generate port change events in response to the ports transitioning from a current spanning tree port state to a new spanning tree port state;
a second event manager disposed at the standby supervisor; and
means for passing the port change events from the first event manager to the second event manager.

22. The intermediate network device of claim 21 wherein each port change event generated by the active event manager identifies the respective port and the new spanning tree port state.

23. The intermediate network device of claim 17 whereby the active supervisor does not inform the standby supervisor of the at least one elected root within the computer network.

24. A computer readable medium containing executable program instructions for continuing operation of a spanning tree protocol (STP) despite crashes or failures at an intermediate network device having a plurality of ports for forwarding messages in a computer network and two or more supervisors, each supervisor including at least one STP engine configured to transition the ports of the device among a plurality of spanning tree port states, the executable program instructions comprising program instructions for:
designating a first supervisor to be an active supervisor and a second supervisor to be a standby supervisor for the device;
running the spanning tree protocol at the active supervisor such that the STP engine at the active supervisor elects at least one root of the computer network and directs the ports to transition among the spanning tree port states;
informing the standby supervisor whenever a port is transitioned to a new spanning tree port state by the active supervisor;
in response to a crash or failure at the active supervisor, designating the standby supervisor to be a newly active supervisor for the network device;
executing a consistency check between port state information at the newly active supervisor and port state information at the ports;
leaving all ports that pass the consistency check in their current spanning tree port state;
transitioning all ports that fail the consistency check to a non-forwarding spanning tree port state; and
identifying the at least one root of the computer network.

25. The computer readable medium of claim 24 wherein the programming steps for informing comprises the programming steps for:
generating, at the active supervisor, a port change event in response to a given port transitioning from a first spanning tree port state to a second spanning tree port state;
associating the port change event with a corresponding sequence number;
notifying the given port of the corresponding sequence number when the active supervisor directs the given port to change spanning tree port states; and
storing, for the given port, the corresponding sequence number.

26. An intermediate network device for use in a computer network, the intermediate network device comprising:

a plurality of ports for forwarding messages;

a first supervisor having at least one spanning tree protocol (STP) engine configured to transition the ports of the device among a plurality of spanning tree port states;

a second supervisor having at least one STP engine configured to transition the ports of the device among a plurality of spanning tree port states;

an elector at the first and second supervisors, the electors configured to cooperate so as to designate the first supervisor to be an active supervisor and the second supervisor to be a standby supervisor, and to activate the STP engine at the active supervisor so that the STP engine elects at least one root of the computer network and directs the ports to transition among the spanning tree port states; and an event manager at the first and second supervisors, the event manager configured to transmit spanning tree port state information from the active supervisor to the standby supervisor; and at least one memory at the standby supervisor configured to store the spanning tree port states received from the active supervisor.

27. The intermediate network device of claim 26 wherein the event manager at the active supervisor is further configured to notify the standby supervisor whenever a port is transitioned from a first spanning tree port state to a second spanning tree port state by the STP engine at the active supervisor.

28. The intermediate network device of claim 26 further comprising a failure detection module disposed at the standby supervisor, the failure detection module configured to detect a crash or failure of the active supervisor, and to activate the STP engine at the standby supervisor, wherein the STP engine at the standby supervisor utilizes the spanning tree port states stored at the standby supervisor to run the spanning tree protocol.

29. The intermediate network device of claim 28 further wherein in response to a detection of a crash or failure at the active supervisor the standby supervisor is designated to be a newly active supervisor, and the STP engine at newly active supervisor elects the at least one root and directs the ports to transition among the spanning tree port states.

* * * * *